United States Patent
Provost et al.

(10) Patent No.: US 11,545,173 B2
(45) Date of Patent: Jan. 3, 2023

(54) AUTOMATIC SPEECH-BASED LONGITUDINAL EMOTION AND MOOD RECOGNITION FOR MENTAL HEALTH TREATMENT

(71) Applicant: THE REGENTS OF THE UNIVERSITY OF MICHIGAN, Ann Arbor, MI (US)

(72) Inventors: Emily Mower Provost, Ann Arbor, MI (US); Melvin McInnis, Ann Arbor, MI (US); John Henry Gideon, Howell, MI (US); Katherine Anne Matton, Ann Arbor, MI (US); Soheil Khorram, Richardson, TX (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 348 days.

(21) Appl. No.: 16/556,858

(22) Filed: Aug. 30, 2019

(65) Prior Publication Data
US 2020/0075040 A1     Mar. 5, 2020

Related U.S. Application Data

(60) Provisional application No. 62/726,147, filed on Aug. 31, 2018.

(51) Int. Cl.
*G10L 25/63*    (2013.01)
*G06N 20/00*    (2019.01)
*G06N 3/08*    (2006.01)

(52) U.S. Cl.
CPC .............. *G10L 25/63* (2013.01); *G06N 3/08* (2013.01); *G06N 20/00* (2019.01)

(58) Field of Classification Search
None
See application file for complete search history.

(56) References Cited

U.S. PATENT DOCUMENTS 7,304,047 B2 * 12/2007 Brown .................... A61P 25/36
                                                            514/211.13
10,740,598 B2 * 8/2020 Yoo ..................... G06K 9/00315
(Continued)

OTHER PUBLICATIONS

Aldeneh and Emily Mower Provost. Using regional saliency for speech emotion recognition. In IEEE International Conference on Acoustics and Speech Signal Processing (ICASSP), New Orleans, LA, 2017.

(Continued)

*Primary Examiner* — Quynh H Nguyen
(74) *Attorney, Agent, or Firm* — Marshall, Gerstein & Borun LLP

(57) ABSTRACT

A method of predicting a mood state of a user may include recording an audio sample via a microphone of a mobile computing device of the user based on the occurrence of an event, extracting a set of acoustic features from the audio sample, generating one or more emotion values by analyzing the set of acoustic features using a trained machine learning model, and determining the mood state of the user, based on the one or more emotion values. In some embodiments, the audio sample may be ambient audio recorded periodically, and/or call data of the user recorded during clinical calls or personal calls.

20 Claims, 7 Drawing Sheets

(56) References Cited

U.S. PATENT DOCUMENTS

| | | | |
|---|---|---|---|
| 2010/0280336 A1* | 11/2010 | Giftakis | A61B 5/4803 600/301 |
| 2014/0046660 A1* | 2/2014 | Kamdar | G10L 25/63 704/235 |
| 2016/0322065 A1 | 11/2016 | Shimoji | |
| 2018/0032611 A1* | 2/2018 | Cameron | G06F 16/685 |
| 2018/0308487 A1* | 10/2018 | Goel | G10L 15/26 |
| 2018/0308508 A1* | 10/2018 | Eyben | G06N 5/046 |

OTHER PUBLICATIONS

Aldeneh, Soheil Khorram, Dimitrios Dimitriadis, and Emily Mower Provost. Pooling acoustic and lexical features for the prediction of valence. In International Conference on Multimodal Interaction (ICMI), Glasgow, Scotland, Nov. 2017.

Barch and Howard Berenbaum. The effect of language production manipulations on negative thought disorder and discourse coherence disturbances in schizophrenia. Psychiatry Research, 71(2):115-127, 1997.

Bardram, Mads Frost, Károly Szántó, and Gabriela Marcu. The MONARCA self-assessment system: a persuasive personal monitoring system for bipolar patients. In ACM SIGHIT International Health Informatics Symposium, pp. 21-30, Miami, FL, 2012. ACM.

Bardram, Mads Frost, Károly Szántó, Maria Faurholt-Jepsen, Maj Vinberg, and Lars Vedel Kessing. Designing mobile health technology for bipolar disorder: a field trial of the MONARCA system. In ACM SIGCHI Conference on Human Factors in Computing Systems (CHI), pp. 2627-2636, Paris, FR, 2013.

Ben-Zeev, Emily A Scherer, Rui Wang, Haiyi Xie, and Andrew T Campbell. Next-generation psychiatric assessment: Using smartphone sensors to monitor behavior and mental health. Psychiatric Rehabilitation Journal, 38(3):218, 2015.

Bradley and Peter J. Lang. Measuring emotion: The self-assessment manikin and the semantic differential. Journal of Behavior Therapy and Experimental Psychiatry, 25(1):49-59, 1994.

Busso, Murtaza Bulut, Chi-Chun Lee, Abe Kazemzadeh, Emily Mower, Samuel Kim, Jeannette N Chang, Sungbok Lee, and Shrikanth S Narayanan, Iemocap: Interactive emotional dyadic motion capture database. Language resources and evaluation, 42(4):335, 2008.

Busso, Srinivas Parthasarathy, Alec Burmania, Mohammed AbdelWahab, Najmeh Sadoughi, and Emily Mower Provost. Mspimprov: An acted corpus of dyadic interactions to study emotion perception. IEEE Transactions on Affective Computing, 8(1):67-80, 2017.

Butzlaff and Jill M Hooley. Expressed emotion and psychiatric relapse: a meta-analysis. Archives of general psychiatry, 55(6):547-552, 1998.

Cieri, David Miller, and Kevin Walker. The fisher corpus: a resource for the next generations of speech-to-text. In LREC, vol. 4, pp. 69-71, 2004.

Cochran, AndréSchultz, Melvin G McInnis, and Daniel B Forger. A comparison of mathematical models of mood in bipolar disorder. In *Computational Neurology and Psychiatry*, pp. 315-341. Springer, 2017.

Cochran, AndréSchultz, Melvin G McInnis, and Daniel B Forger. Testing frameworks for personalizing bipolar disorder. *Translational psychiatry*, 8(1):36, 2018.

Cochran, MG McInnis, and DB Forger. Data-driven classification of bipolar i disorder from longitudinal course of mood. Translational psychiatry, 6(10):e912, 2016.

Dehak, Patrick Kenny, Réda Dehak, Pierre Dumouchel, and Pierre Ouellet. Front-end factor analysis for speaker verification. *IEEE Transactions on Audio, Speech, and Language Processing*, 19(4):788-798, 2011.

Elevåg, Peter W Foltz, Daniel R Weinberger, and Terry E Goldberg. Quantifying incoherence in speech: An automated methodology and novel application to schizophrenia. *Schizophrenia Research*, 93(1):304-316, 2007.

Faurholt-Jepsen, Maj Vinberg, Ellen Margrethe Christensen, Mads Frost, Jakob Bardram, and Lars Vedel Kess-ing. Daily electronic self-monitoring of subjective and objective symptoms in bipolar disorderthe MONARCA trial protocol (MONitoring, treAtment and pRediCtion of bipolAr disorder episodes): a randomised controlled single-blind trial. *BMJ open*, 3(7):e003353, 2013.

Garimella, Arindam Mandal, Nikko Strom, Bjorn Hoffmeister, Spyros Matsoukas, and Sree Hari Krishnan Parthasarathi. Robust i-vector based adaptation of DNN acoustic model for speech recognition. In *Interspeech*, pp. 2877-2881, Dresden, Germany, 2015.

Garofolo, Lori F Lamel, William M Fisher, Jonathan G Fiscus, and David S Pallett. Darpa timit acoustic-phonetic continous speech corpus cd-rom. nist speech disc 1-1.1. *NASA STI/Recon technical report n*, 93, 1993.

Georgiev, Sourav Bhattacharya, Nicholas D Lane, and Cecilia Mascolo. Low-resource multi-task audio sensing for mobile and embedded devices via shared deep neural network representations. *Proceedings of the ACM on Interactive, Mobile, Wearable and Ubiquitous Technologies*, 1 (3):50, 2017.

Gideon, Emily Mower Provost, and Melvin McInnis. Mood state prediction from speech of varying acoustic quality for individuals with bipolar disorder. In *IEEE International Conference on Acoustics, Speech and Signal Processing (ICASSP)*, pp. 2359-2363, Shanghai, China, 2016.

Graves, A. Mohamed, and G. E. Hinton. Speech recognition with deep recurrent neural networks. In *IEEE International Conference on Acoustics, Speech and Signal Processing (ICASSP)*, Vancouver, BC, Canada, 2013.

Hamilton. A rating scale for depression. *Journal of Neurology, Neurosurgery, and Psychiatry*, 23:56-62, 1960.

Henry, Melissa J Green, Amber de Lucia, Corinne Restuccia, Skye McDonald, and Maryanne O'Donnell. Emotion dysregulation in schizophrenia: reduced amplification of emotional expression is associated with emotional blunting. *Schizophrenia Research*, 95(1):197-204, 2007.

Hoffman, Susan Stopek, and Nancy C Andreasen. A comparative study of manic vs schizophrenic speech disorganization. *Archives of General Psychiatry*, 43(9):831-838, 1986.

Hofmann, Alice T Sawyer, Angela Fang, and Anu Asnaani. Emotion dysregulation model of mood and anxiety disorders. *Depression and Anxiety*, 29(5):409-416, 2012.

Joormann and Ian H Gotlib. Emotion regulation in depression: relation to cognitive inhibition. *Cognition and Emotion*, 24(2):281-298, 2010.

Karam, Emily Mower Provost, Satinder Singh, Jennifer Montgomery, Christopher Archer, Gloria Harrington, and Melvin Mcinnis. Ecologically valid long-term mood monitoring of individuals with bipolar disorder using speech. In *IEEE International Conference on Acoustics, Speech and Signal Processing (ICASSP)*, Florence, Italy, May 2014.

Keller, Philip W Lavori, Barbara Friedman, Eileen Nielsen, Jean Endicott, Pat McDonald-Scott, and Nancy C Andreasen. The longitudinal interval follow-up evaluation: a comprehensive method for assessing outcome in prospective longitudinal studies. *Archives of general psychiatry*, 44(6):540-548, 1987.

Khorram, John Gideon, Melvin McInnis, and Emily Mower Provost. Recognition of depression in bipolar disorder: Leveraging cohort and person-specific knowledge. In *Interspeech*, San Francisco, CA, 2016.

Khorram, Mimansa Jaiswal, John Gideon, Melvin McInnis, and Emily Mower Provost. The priori emotion dataset: Linking mood to emotion detected in-the-wild. In *Interspeech*, 2018.

Khorram, Zakariah Aldeneh, Dimitrios Dimitriadis, Melvin McInnis, and Emily Mower Provost. Capturing long-term temporal dependencies with convolutional networks for continuous emotion. In *Interspeech*, Stockholm, Sweden, Aug. 2017.

Kim and David J Miklowitz. Expressed emotion as a predictor of outcome among bipolar patients undergoing family therapy. *Journal of Affective Disorders*, 82(3):343-352, 2004.

Kim. Convolutional neural networks for sentence classification. *Conference on Empirical Methods in Natural Language Processing (EMNLP)*, 2014.

(56) References Cited

OTHER PUBLICATIONS

Krizhevsky, Ilya Sutskever, and Geoff Hinton. Imagenet classification with deep convolutional neural networks. In *Advances in Neural Information Processing Systems (NIPS)*, pp. 1106-1114, Lake Tahoe, NV, 2012.

Lane, Mashfiqui Mohammod, Mu Lin, Xiaochao Yang, Hong Lu, Shahid Ali, Afsaneh Doryab, Ethan Berke, Tanzeem Choudhury, and Andrew Campbell. Bewell: A smartphone application to monitor, model and promote wellbeing. In *International Conference on Pervasive Computing Technologies for Healthcare*, pp. 23-26, Dublin, Ireland, 2011.

Laurent and Emily Rubin. Challenges in emotional regulation in asperger syndrome and high-functioning autism. *Topics in Language Disorders*, 24(4):286-297, 2004.

Mazefsky, John Herrington, Matthew Siegel, Angela Scarpa, Brenna B Maddox, Lawrence Scahill, and Susan W White. The role of emotion regulation in autism spectrum disorder. *Journal of the American Academy of Child & Adolescent Psychiatry*, 52(7):679-688, 2013.

McInnis, S Assari, M Kamali, K Ryan, SA Langenecker, EHF Saunders, K Versha, S Evans, KS O'Shea, E Mower Provost, D Marshall, D Forger, J Deldin, and S. Zoellner. Cohort profile: The heinz c prechter longitudinal study of bipolar disorder. *Int J Epidemiology*, DOI: 10.1093/ije/dyx229, 2017.

McInnis. Prechter bipolar research program. <http://www.prechterprogram.org/bipolar-research/publications,>, 2017.

Mennin, Richard G Heimberg, Cynthia L Turk, and David M Fresco. Preliminary evidence for an emotion dysregulation model of generalized anxiety disorder. *Behaviour Research and Therapy*, 43(10):1281-1310, 2005.

Provost. Identifying salient sub-utterance emotion dynamics using flexible units and estimates of affective flow. In *IEEE International Conference on Acoustics, Speech and Signal Processing (ICASSP)*, pp. 3682-3686, Vancouver, British Columbia, Canada, May 2013.

Nikolaou, Pedro Antonio Gutiérrez, Antonio Durán, Isabelle Dicaire, Francisco Fernández-Navarro, and César Hervás-Mart'inez. Detection of early warning signals in paleoclimate data using a genetic time series segmentation algorithm. *Climate Dynamics*, 44(7-8):1919-1933, 2015.

Nurnberger, J. I., M. C. Blehar, C. A. Kaufmann, C. York-Cooler, S. G. Simpson, J. Harkavy-Friedman, J. B. Severe, D. Malaspina, and T. Reich. Diagnostic interview for genetic studies. rationale, unique features, and training. nimh genetics initiative. *Archives of General Psychiatry*, 51(11):849-859, 1994.

Sachs, C. Guille, and S. L. McMurrich. A clinical monitoring form for mood disorders. *Bipolar Disorder*, 4(5):323-327, 2002.

Sainath, M. Abdel-rahman, B. Kingsbury, and B. Ramabhadran. Deep convolutional neural networks for lvcsr. In *IEEE International Conference on Acoustics, Speech and Signal Processing (ICASSP)*, 2013.

Sainath, O. Vinyals, A. Senior, and H. Sak. Convolutional, Long Short-Term Memory, fully connected Deep Neural Networks. In *IEEE International Conference on Acoustics, Speech and Signal Processing (ICASSP)*, Brisbane, Australia, 2015.

Sak, A. W. Senior, and F. Beaufays. Long short-term memory recurrent neural network architectures for large scale acoustic modeling. In *Interspeech*, Singapore, 2014.

Sak, O. Vinyals, G. Heigold, A. W. Senior, E. McDermott, R. Monga, and M. Mao. Sequence Discriminative Distributed Training of Long Short-Term Memory Recurrent Neural Networks. In *Interspeech*, Singapore, 2014.

Saon, Hagen Soltau, David Nahamoo, and Michael Picheny. Speaker adaptation of neural network acoustic models using i-vectors. In *Automatic Speech Recognition and Understanding (ASRU)*, pp. 55-59, Olomouc, Czech Republic, 2013.

Schuller, Bogdan Vlasenko, Florian Eyben, Martin Wollmer, Andre Stuhlsatz, Andreas Wendemuth, and Gerhard Rigoll. Cross-corpus acoustic emotion recognition: Variances and strategies. *IEEE Transactions on Affective Computing*, 1(2):119-131, 2010.

Schuller, Zixing Zhang, Felix Weninger, and Gerhard Rigoll. Using multiple databases for training in emotion recognition: To unite or to vote? In *Twelfth Annual Conference of the International Speech Communication Association*, 2011.

Senior and Ignacio Lopez-Moreno. Improving DNN Speaker Independence with I-vector Inputs. In *IEEE International Conference on Acoustics, Speech and Signal Processing (ICASSP)*, Florence, Italy, 2014.

Shangguan and E. Mower Provost. Emoshapelets: Capturing local dynamics of audiovisual affective speech. In *Affective Computing and Intelligent Interaction (ACII)*, Xi'an, China, Sep. 2015.

Tan, Y. Qian, D. Yu, S. Kundu, L. Lu, K. C. Sim, X. Xiao, and Y. Zhang. Speaker-aware training of LSTM-RNNs for acoustic modelling. In *IEEE International Conference on Acoustics, Speech and Signal Processing (ICASSP)*, pp. 5280-5284, Shanghai, China, 2016.

Taylor, Robyn Reed, and Sheri Berenbaum. Patterns of speech disorders in schizophrenia and mania. *The Journal of Nervous and Mental Disease*, 182(6):319-326, 1994.

Young, J. T. Biggs, V. E. Ziegler, and D. A. Meyer. A rating scale for mania: reliability, validity and sensitivity. *The British Journal of Psychiatry*, 133:429-35, 1978.

Zhang, Emily Mower Provost, and Georg Essl. Cross-corpus acoustic emotion recognition with multi-task learning: Seeking common ground while preserving differences. *IEEE Transactions on Affective Computing*, 2017.

Zhang, Georg Essl, and Emily Mower Provost. Automatic recognition of self-reported and perceived emotion: Does joint modeling help? In *International Conference on Multimodal Interaction (ICMI)*, Tokyo, Japan, Nov. 2016.

\* cited by examiner

AUTOMATIC SPEECH-BASED LONGITUDINAL EMOTION AND MOOD RECOGNITION FOR MENTAL HEALTH TREATMENT

CROSS-REFERENCE TO RELATED APPLICATION

The present application claims priority to U.S. Application No. 62/726,147, filed Aug. 31, 2018. The priority application is hereby incorporated by reference.

STATEMENT OF GOVERNMENTAL INTEREST

This invention was made with government support under IIS1651740 awarded by the National Science Foundation and under MH100404 awarded by the National Institutes of Health. The government has certain rights in the invention.

FIELD OF THE DISCLOSURE

The present disclosure relates to methods and systems for measuring and interpreting the relationship between an individual's social environment and mood, in particular, emotion and/or mood recognition based on analysis of speech data included in audio signals.

BACKGROUND

Bipolar disorder (BD) is a severe, chronic mental illness that typically begins in early adulthood and is characterized by periodic and pathological mood changes ranging from extreme lows (depression) to extreme highs (mania). There are several sub-types of BD defined in the Diagnostic and Statistical Manual of the American Psychiatric Association, version 5 (DSM 5); each category is operationalized in terms of the nature and number of symptoms that are present and identified by a trained clinician. There are 3 primary categories: 1) BD type I wherein the individuals experience overt manias, broadly defined as elevated and misguided energy states that result in incapacitation (the individual is unable to responsibly discharge social, personal, or vocational duties). 2) BD type II wherein the individuals experience hypomanias, broadly defined as less severely elevated energy states (compared to mania) wherein there are qualitative and quantitative change in energy states that measurably impair the ability of the individual to discharge his/her duty. 3) BD Unspecified describes a clinical state and pattern wherein either the nature or number of symptoms, although identifiable and present, is insufficient to substantiate the DSM 5 category. Individuals in the unspecified category frequently experience disruptions in their lives and require medical management. The depressed states in BD are clinically identical from a phenomenological perspective to depressive states in individuals who experience only Major Depressive Disorder (MDD) as defined by the DSM 5. The difference between depressed states in MDD and BD is primarily found in the time course of the states; depressions in BD typically last for shorter periods of time (weeks to months) while depressions in MDD last longer (months to years). BDI and BDII combined are found in up to two percent of the world's population (including BD unspecified will push the frequency to 4%) with a core clinical expression pattern related to emotion, energy, and psychomotor activity. These core clinical signs and symptoms are monitored to gauge the health and progress of the individual in treatment. The dynamic nature of BD demands efficient clinical monitoring to detect mood changes in sufficient time to treat or mitigate their severity. Intense clinical monitoring is effective but unrealistic due to cost and the availability of skilled health care providers. Yet, individuals with mood disorders (BD and MDD) require regular clinical monitoring to promote long-term health. Current resource-intense and clinic-based methods are costly and inefficient. Clinical observations and evaluations of speech and social interaction patterns are essential to psychiatric evaluation, but consistent or reliable methods to measure, compare, and document changes beyond the opinion of the clinical observer (variable) and the memory of the patient (unreliable) are lacking. These clinical challenges have significantly hampered the development of objective biomarkers. For example, current mood recognition systems are focused on mapping between speech to mood directly, which is challenging due to the complexity of the speech signal. Strategies for mobile monitoring for mental health have mostly relied upon self-reported diagnosis of a disorder on a device or social media to identify features indicative of the disorder, be it anxiety, BD, depression or anorexia. However, these interactive self-reports are often incomplete or misleading. An alternative approach is to directly recognize mood from observed behavior. Descriptive statistics of phone calls, such as duration and frequency have been associated with mood episodes, and it is clinically known that activity levels increase in mania and decrease in depression. The relationship between emotion and mood has been gaining attention, and the utility of using measures of emotion to detect depressed speech. However, these attempts have been conducted in a controlled environment, limiting their use "in the wild." No methods for evaluating emotion 'in the wild' to predict mood states exist in the prior art.

Attempts have been made to formulate automated methods for identifying mood by analyzing speech audio signals. These attempts have sought to slot speech into pre-determined emotion/mood categories. For example, U.S. Patent Application Publication US 20160322065A1 to Shimoji discusses identifying human emotions/moods including anger, sadness, and happiness. However, such emotional categories are nebulous and rely on colloquial understandings of psychology (folk-psychology) that are lacking in quantitative and scientific grounding. The testing conducted with respect to the Shimoji application indicates that the methods and systems disclosed therein did not result in sufficient accuracy to be useful. In short, current challenges in speech emotion recognition and assistive technology include generalizability, robustness, and performance. As such, methods and systems for accurately identifying emotions and/or mood by analyzing speech audio signals using current and rigorous clinical definitions are needed.

BRIEF SUMMARY

In one aspect, a method of predicting a mood state of a user may include, based on the occurrence of an event, recording an audio sample via a microphone of a mobile computing device of the user. The method may further include extracting a set of acoustic features from the audio sample and generating one or more emotion values, by analyzing the set of acoustic features using a trained machine learning model. The method may further include determining the mood state of the user based on the one or both of the one or more emotion values.

In another aspect, a mood state prediction system may include a first computing device comprising a processor, a microphone, and a non-transitory memory, the memory storing instructions that, when executed by the processor, cause the processor to receive, based on the occurrence of an event, an audio sample via the microphone. The mood state prediction system may include a second computing device including a processor and a non-transitory memory. The memory of the second computing device may include instructions that when executed by the processor cause the processor to extract a set of acoustic features from the audio sample, generate one or more emotion values, by analyzing the set of acoustic features using a trained machine learning model; and determine a mood state of the user based on the one or more emotion values. The first computing device and the second computing device may refer to the same device. In some embodiments, the first computing device and the second computing device may be communicatively coupled via a network.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
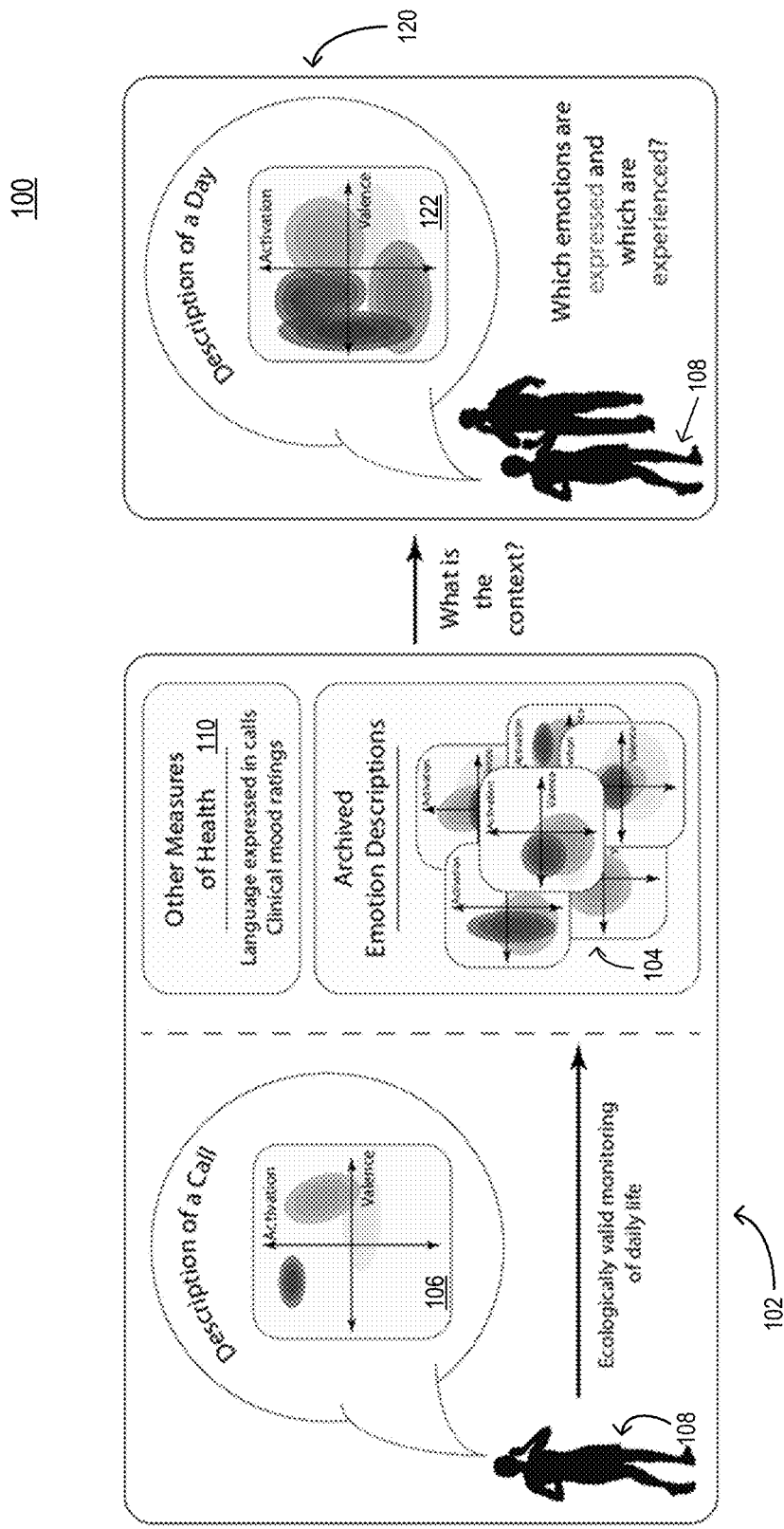
FIG. 1 depicts an example data flow diagram for recognizing mood from natural speech conversations and for augmenting this recognition by including critical information about the emotions that one expresses and experiences, according to an embodiment.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present techniques may measure an individual's emotional environment, which may be defined as the emotions that an individual expresses or experiences. The present techniques may include methods and systems (e.g., a mobile phone application) for ambient sensing via activation of a microphone of a device (e.g., a mobile computing device such as a smartphone, such as the mobile device 502 of FIG. 5), wherein the application receives/retrieves audio and processes the audio to determine if the sound includes human speech. The microphone of a computing device (e.g., the input device 502E of the mobile device 502 of FIG. 5) may be activated periodically during a period of time (e.g., over several minutes, hours, days, weeks, months, etc.). If the audio includes human speech, then the application may determine whether the device owner is the one speaking (i.e., speaker recognition). If the speaker is recognized/identified, then the application may estimate the emotion expressed, noting if the device owner or another person expressed the emotion.

Herein, emotion values may be measured in terms of valence (positive vs. negative) and/or activation (calm vs. excited). Emotion values may include values other than valence and activation. The emotional environment may be associated with other phenomena, such as mental or physical health. Example embodiments may include depression monitoring, bipolar disorder monitoring, anxiety monitoring, etc. Specifically, emotion may be defined in terms of categorical emotions (e.g., sad/happy) and/or dimensional descriptions (e.g., positive/negative and/or calm/excited). Categorical emotions may be colloquially defined, as noted above, or rigorously defined (e.g., as in psychological literature). Dimensional descriptions are more likely to have meaning across contexts (e.g., fearful behavior differs depending on the context—being chased by a bear vs. failing an exam) while dimensional descriptors are inherently generalizable (e.g., negativity can be observed without context). Dimensional descriptions may also have meaning across contexts regarding positivity. Similarly, some emotions may be described by dimensional descriptions successfully when they are not properly categorizable (i.e., are ambiguous). For example, one may feel a type of astonishment at the loss of a loved one that varies greatly from the astonishment the same person feels when winning the lottery. Again, the categories defined in the prior work are not generalizable. Using generalizable definitions is an advantage of the present techniques over the prior art that allows for accurate and repeatable prediction of mood.

Bipolar Disorder is a chronic psychiatric illness characterized by pathological mood swings associated with severe disruptions in emotion regulation. Clinical monitoring of mood is key to the care of these dynamic and incapacitating mood states. Frequent and detailed monitoring improves clinical sensitivity to detect mood state changes, but typically requires costly and limited resources. Speech characteristics change during both depressed and manic states, suggesting automatic methods applied to the speech signal can be effectively used to monitor mood state changes. However, speech is modulated by many factors, which renders mood state prediction challenging. Emotion may be used as an intermediary step to improve mood state prediction. Critical steps in developing a pipeline to improve mood state prediction include (1) a new in the wild emotion dataset, collected from everyday smartphone conversational speech recordings, (2) activation/valence emotion recognition baselines on this dataset having, for example, a Pearson Correlation Coefficient (PCC) of 0.71 and 0.41, respectively, and (3) significant correlation between predicted emotion and mood state for individuals with bipolar disorder. This provides evidence and a working baseline for the use of emotion as a meta-feature for mood state monitoring.

The present techniques demonstrate that emotion can simplify mood prediction by acting as an intermediary between speech (rapidly varying) and mood (slowly varying). One of the hallmark symptoms of BD is emotion dysregulation, suggesting that the tracking of emotion changes will provide important insights into an individual's mood variation. Herein, emotion values may be defined in terms of valence (positive vs. negative) and activation (calm vs. excited), both of which are observable from expressed behaviors such as speech.

The present techniques include methods and systems for improving mood detection by analyzing emotion, which has more slowly varying properties using a longitudinal dataset of natural speech patterns collected from individuals with BD who used a smartphone with a secure app that recorded his/her side of all conversations made or received over a period of up to twelve months. These patients were assessed weekly for depressive and manic symptoms using standardized scales by a study clinician. A subset of this dataset was annotated with labels of valence and activation, and this dataset was analyzed to associate natural expressions of emotion with changes in mood. The present techniques address the predictability of emotion in natural smartphone conversations and the relationship between mood and natural expressions of emotion. The present disclosure includes a description of collection and annotation of the dataset. Natural speech emotion classification baselines on this dataset are also described, wherein a PCC of 0.71 and 0.41 for detecting activation and valence, respectively, are achieved. The present techniques also demonstrate that there is a significant positive correlation between heightened mood and both activation and valence. Critically, these emotion patterns are inherently subject dependent, highlighting the importance of attuning to individual variability when designing mental health monitoring support. The challenges associated with modeling contextualized categories of emotion are further discussed above. In general, the automatic passive mood monitoring techniques disclosed herein address the need for ongoing monitoring in a cost efficient manner to predict the course and outcome of chronic human disease such as BD.

INTRODUCTION

FIG. 1 depicts an example data flow diagram 100 for recognizing mood from natural speech conversations and for augmenting this recognition by including critical information about the emotions that one expresses and experiences. The present techniques include technology, data collection, and computational models for providing objective assessments of an individual's behavior and social environment based on analyses of comprehensive mobile data that may include both phone calls and/or ambient speech recordings. FIG. 1 depicts providing an ecologically valid context 102 in which to study how an individual's behavior and social environment impact his/her wellness. Specifically, activation and valence information 104 extracted from the description of a phone call 106 of the individual/user 108 are collected, along with other measures of health 110. It should be appreciated that the phone call 106 may correspond to an ambient sound recording collected via a microphone of a mobile computing device, in some embodiments.

The present techniques result in measurement methods for determining how moods and mood episodes shape and are shaped by both the behavior of an individual and daily interactions over time, leading to individualized early warning signs (EWS) for mood disorders. Establishing the EWS may further determining the need for and nature of an actionable intervention. The present techniques may be deployed beyond mood disorders, focusing on individuals at risk for opiate abuse, post-traumatic stress disorder, anxiety, and suicidality. One goal of the present techniques is to establish reliable methods for the study of social and personal parameters, fundamental to the success of the precision medicine initiative.

Figure 5:
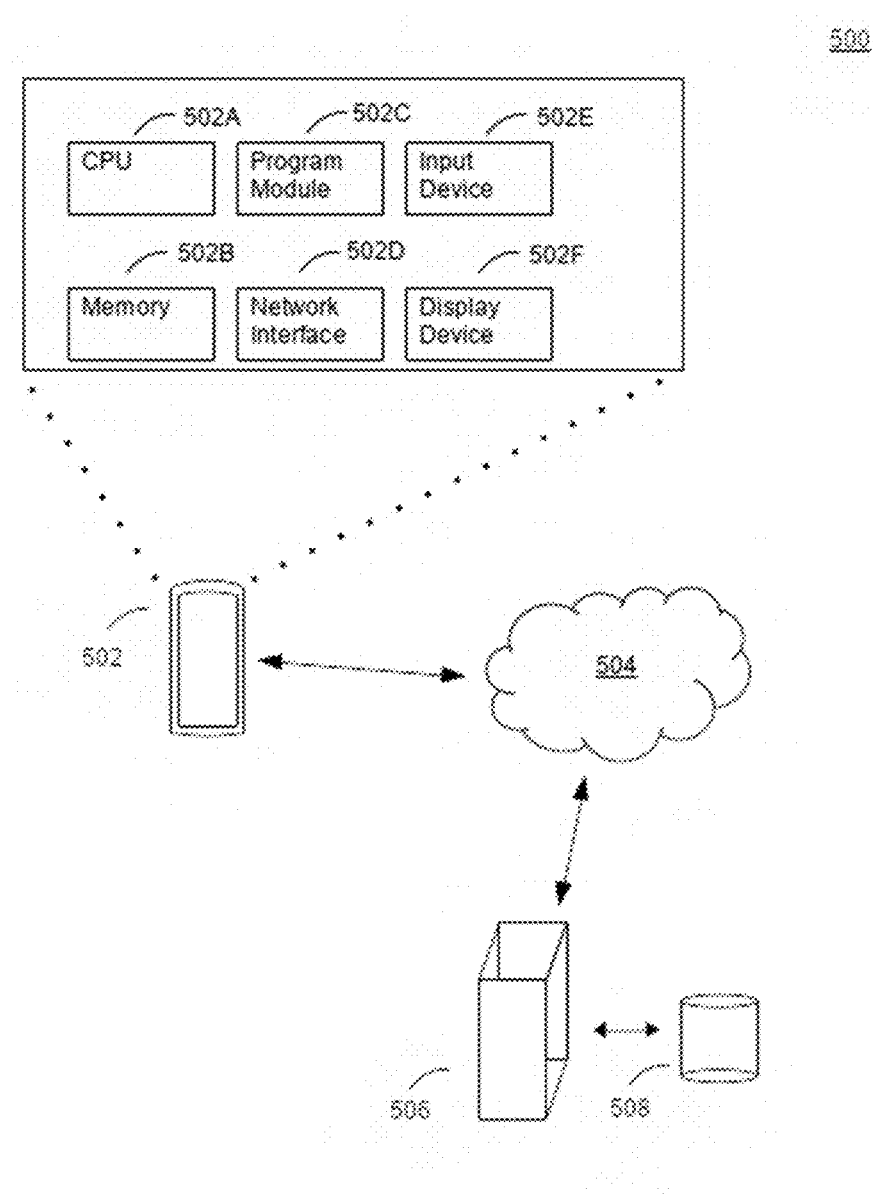
FIG. 5 depicts a system diagram for implementing the present techniques.

The present techniques include a mobile health monitoring system, as depicted with more detail in FIG. 5 that gathers speech data from personal smartphones and initial Machine Learning (ML) algorithms to analyze the acoustics of the collected speech to predict mood states. Testing data demonstrates the feasibility and acceptability of monitoring speech patterns for up to one year and the ability to identify mood state from speech data collected during a clinical interview (AUC 0.78). In an embodiment, speech collected when the user 108 is engaged in cellphone conversations and speech from the ambient environment may be used to study a test cohort with bipolar disorder (BD) and unaffected controls. An objective of the present techniques is to quantify mood and mood state changes in the context of the social environment, wherein social environment may be quantified in terms of emotion that an individual either expresses or experiences.

There are several embodiments of the present techniques. A first embodiment includes determining levels of expressed emotions 120 of the ambient social environment of the user 108. This may be measured in terms of activation (energy) and valence (positivity) in ambient speech as shown in a description 122. In some embodiments, the present techniques may use deep learning models that are deployable either on mobile phones or in the cloud. Another embodiment may include collecting data from smartphones that includes all personal speech from incoming or outgoing phone calls and measuring speech from the ambient environment. In all cases, this experimental approach includes using state-of-the-art asynchronous security to preserve privacy (e.g., via independent encryption and decryption security keys). The security, feasibility, and acceptability of the present techniques allow the generation of a comprehensive data corpus, which can be used to establish the mood and emotional patterns over time of the individual participant. Yet another embodiment may include developing machine learning approaches that can identify mood symptoms using the collected data described in the embodiments above, modeling a combination of an individual's natural speech patterns while engaged in a cellphone conversation and an individual's social environment. The present techniques include methods and systems capable of automatically transcribing speech and estimating patterns of expression that convey critical information about mood state. These approaches may involve multimodal ML and fusion approaches.

The present techniques include generalizability of methods and systems by tracking symptoms (e.g., emotion) over time, rather than mapping from low-level (detailed) speech features to mood. The present techniques may focus on robustness by developing methods that control for nuisance modulations. The combination of tracking symptoms and robustness result in improved performance in ecologically valid collections. Further, the results provide quantitative insight into the relationship between emotion and language variation and user state variation, providing new directions and links between the fields of emotion recognition technology. As noted, efficient and regular mood monitoring is needed to ensure long-term wellness for individuals with mental health conditions, such as PTSD, bipolar disorder, anxiety, depression, and stress. These conditions are associated with changes in emotion expression patterns. The presented approaches model these changes to identify social early warning signs.

The present techniques include an innovative approach to understanding health that challenges the prevailing approach in clinical care by pioneering the development of new longitudinal, passive, smartphone monitoring systems to: (1) act as early warning signs for necessary or preventative medical interventions and (2) gain new fundamental knowledge on how behaviors measurably change with changes in mental health. Herein, the design of new behavior tracking approaches that focus on an individual's social environment are discussed, measured in terms of emotions that an individual expresses and those that are expressed by others (emotional experiences). Emotion may be measured from both cellphone conversations (acoustics and language) of the user 108 and/or from the environment of the individual 108 (acoustics only) as he/she moves through the day. Expressed emotions from social interactions may influence illness patterns in bipolar disorder and many other disorders and provide critical context for understanding health and sickness patterns.

As noted above, clinical measurements are needed. A goal of the present techniques is to move away from measurement subject to recall biases of both the patient 108 and the clinician, moving towards objective measurement that will shed light on the components of an individual's day that contribute to the health of the patient 108. This technology is based on research and experience in the development of a system. Another embodiment of the system may include information gathered over a period of 6-12 months from individuals with bipolar disorder and unstable mood fluctuations, as well as unaffected controls (no history of psychiatric disorders). Empirical evidence has shown that encounters within the health systems provide additional information on course and outcome of illness and health patterns.

The present techniques may include approaches in speech-centered behavior modeling that directly encode clinical knowledge. These algorithms may extract information about what was said (language from cellphone conversations) and how it was said (emotion from cellphone conversations and from ambient sensing of the social environment). Techniques for detecting mood state (e.g., mania and/or depression) using this information are also disclosed herein, which may simplify the detection problem by reconciling fundamental differences in time scale: speech is rapidly varying and mood state is slowly varying. It is also clinically interpretable because it will quantify how patterns in behavior relate to mood state. A symptom-centered approach may extend to other mental and physical health diseases that are characterized by the occurrence of "sickness-related" behaviors. In some embodiments, discussions with U.S. Food and Drug Administration (FDA) consultants regarding the indications and approval of the predictive technology described herein may occur. In some cases, the present techniques may be used to detect mood severity. For example, with a mood state (e.g., depression), the present techniques may quantify a mood according to a label (e.g., low, medium, or high), a scalar value, a real number, etc.

The present techniques represent significant advancements in both the fields of engineering and psychiatry. For example, with respect to engineering, the proposed techniques address current limitations in the design of robust and generalizable data collection and behavior extraction algorithms. In psychiatry, the present techniques lead to major advances in the field by creating the first dataset that provides a longitudinal, objective linking between an individual's social interactions and his/her mental health. In both fields, the present techniques result in the first robust method for evaluating expressed emotion in the personal environment of the individual 108. The present techniques include solutions for addressing current challenges in speech emotion recognition systems and in assistive technology that include generalizability, robustness, and performance. The proposed methods improve generalizability by extracting temporal descriptions 104 of emotional behavior in terms of valence and activation, rather than contextualized categorical labels (e.g., fear). The present techniques improve robustness by controlling for nuisance modulations. Finally, the present techniques focus on extracting secondary features whose variation is more directly in line with the slowly varying behavior of interest (mood), creating a level of performance not possible in current approaches.

The present techniques have broad impact across the field of mental health. The capacity to identify and predict impending episodes of illness based on speech and behavioral patterns has the potential to radically change monitoring and treatment strategies for patients, families, and care providers. The majority of psychiatric patients simply do not recognize the early symptoms of illness. The monitoring capabilities disclosed herein, based on longitudinal patterns, may be shared with family and care providers to flag emotion-centered early warning signs, track the severity of disease, and to identify disease progression or suicide risk. Further, the present techniques may extend understanding of the relationship between emotion expression and mental health (e.g., schizophrenia, anxiety, depression, and autism). The detailed methods and clinical interactions of the present techniques may establish and maintain fundamental elements of mobile security in the system and personal trust of the individual participant 108. The present techniques address an important problem in health: behavior understanding. Emotion recognition provides tools to gain insight into the daily life of the individual 108 by focusing on how patterns of emotion expression change with the health and mood of the individual 108. Emotion recognition applied in an ecologically valid manner will provide the glimpses into the personal activity of the individual 108 and the quality of social interactions of the individual 108. This information can serve as an early warning sign that family members, clinicians, and individuals can use to understand when intervention may be necessary.

Example Study Participants and Testing Methodologies

The methods and systems were trained and tested in an independent study by providing a study smartphone with the app installed to a group of individuals with BD (e.g., the individual 108) and healthy controls who used the phone as their primary device for up to one year (e.g., avg. 26 weeks). Mood was measured through weekly structured telephone interviews with study clinicians using the Hamilton Depression Scale (HamD) and the Young Mania Rating Scale (YMRS) (assessment calls). All other calls were considered to be personal calls. A number of calls was recorded in a database (e.g., 46,276 recorded calls from the 51 participants with BD (e.g., 1,122 assessment calls)). All security and human subject matters were approved and monitored. The collected data was analyzed to predict the mood state of the assessment calls using a subject-independent system, even given variations in phone model and recording conditions.

The performance of the methods and systems may be assessed using the Area Under the Receiver Operating Characteristic Curve (AUC) metric. For example, AUCs of 0.72+/0.20 for manic states and 0.75+/−0.14 for depressed states may be determined. The approach may then be personalized by merging the subject-independent system with a system adapted to a single person. Performance may be improved significantly (e.g., 0.78+/−0.14 AUC for depression). An emotion recognition proof of concept study was performed using the collected data set. For example, 13,611 segments of speech (6-8 seconds each) from 12 participants were annotated, wherein each segment was annotated on average 4 times by a team of 11 human listeners using a discrete 9-point Likert scale (1=low; 9=high). Emotion recognition algorithms using these data were then developed, demonstrating that the algorithms' predictions were well correlated with activation and valence (e.g., Pearson's Correlation Coefficients of 0.712 and 0.405, respectively). The present techniques have also been used to demonstrate that automatic estimates of emotion correlate to mood state and mood symptom severity.

The study participants were drawn from the Prechter Bipolar longitudinal cohort (PrBP), a longitudinal study that began in 2005, and regarding which there are 75 peer-reviewed publications. The participants underwent a detailed initial assessment, followed with bi-monthly assessments and an annual review; including execution of consent and data collection instruments. Clinical diagnoses were established using all available clinical data, including a standardized interview of the participants and follow up information as well as medical records. Initial DSM IV diagnoses were updated to DSM 5. The clinical course is highly variable; data-driven modeling of clinical symptoms within the PrBP shows that approximately 25% of affected BD individuals shift mood states frequently (rapid cycling).

In one sub-study the participants were a number of individuals with BD and healthy controls. The inclusion criteria included: BD type I or II, no medical or neurological disease, and no active history of substance abuse. All study participants were provided with a smartphone and were asked to use the smartphone as their primary device. Participants were enrolled for a given time (e.g., several weeks). Thousands of call records and hours of corresponding call recordings were collected. Participants were clinically evaluated in weekly assessment calls to assess the level of depression (HamD) and mania (YMRS). All other recordings were referred to as personal calls. Mood labels were assigned to all assessment calls based on the HamD and YMRS scales (e.g., euthymic, manic, depressed, and excluded). For example, some calls were labeled euthymic if they had a score of six or less on both the HamD and YMRS scales; manic if the score was ten or greater on the YMRS and less than ten on the HamD; and depressed if the score was ten or greater on the HamD and less than ten on the YMRS. All other assessments were excluded from experiments. For example, the following table depicts mood state categories defined by HamD and YMRS measures, including the number of total assessments and the mean and standard deviation of assessments per subject, according to an embodiment:

| Mood | HamD | YMRS | Number | # Per Subject |
|---|---|---|---|---|
| Euthymic | <=6 | <=6 | 70 | 5.8 ± 3.4 |
| Manic | <10 | >=10 | 27 | 2.7 ± 1.9 |
| Depressed | >=10 | <10 | 120 | 10.0 ± 6.4 |
| Excluded | Else | Else | 96 | 8.7 ± 6.7 |

Although the above table lists four possible mood states, in some embodiments, other mood state definitions may be developed/deployed in some embodiments. For example, mood state categories in an embodiment may employ one or more dimensional scale related to emotional regulation and/or dysregulation related to measuring Autism Spectrum Disorder.

Studies based on BD are justified due to the rapidly changing mood states inherent in the illness. A relatively small number of subjects can be analyzed to characterize in detail the clinical states associated with speech and sound signals. In other embodiments, the findings and methods developed herein may be tested on a larger scale, multi-site study that is externally funded. For example, in an embodiment 50 individuals (40 BD, 10 controls) were ascertained from the Prechter Bipolar Longitudinal (PrBP) study and had at least two years of follow-up data on clinical outcomes. Individuals with BD were prioritized based on their variance of their PHQ9 scores, those with greatest variance will be invited to participate. All participants were US-born and native English speakers to minimize accent variation. For example, inclusion criteria included (1) at least two years of PrBP clinical follow-up data to evaluate mood stability patterns (2) age 18-65, (3) familiarity with smartphone technology and willing to use a smart phone (e.g., an Android or iPhone) for one year, (4) willing to engage in clinical assessment calls with a clinically trained Master of Science level researcher by phone weekly, (5) willing to have smartphone calls for >60 minutes per week, (6) agree to allow annotation of personal calls for mood and emotion, and (7) evidence of at least 10 encounters with a medical facility (all encounter, clinical, and laboratory data will be included in subsequent analyses). Exclusion criteria included (1) medical or neurological disorders that affect speech (including cardiac and respiratory illnesses that can affect breathing patterns), (2) active hazardous substance use (weekly intoxication or >5 drinks per setting on a weekly basis), (3) chronic psychopathology (e.g., history of persistent persecutory delusions), IQ<80, developmental delay disorders (e.g., autism), or other medical conditions considered by the PI to interfere with speech and behavior.

An initial assessment included a comprehensive clinical review of the potential participant prior to acceptance into the project, including a review of all data collected under the PrBP protocol, and all available clinical records to render and confirm DSM 5 diagnostic criteria and estimate the level of mood instability over time. Enrollment was performed initially to obtain data needed to train the speaker verification component (e.g., bubble 222 of the pipeline 200 depicted in FIG. 2A). Approximately 10 minutes of speech was collected, both conversational and scripted, to build a robust model of the participant's voice. Weekly assessment calls were performed over telephone by a Master of Science (MS) level clinical researcher using HamD and YMRS, to assess mood states associated with depression and mania, and generate a comprehensive database of clinical assessments for supervised learning of speech and behavior patterns in relation to mood states. The assessment calls began with an informal conversation wherein both sides of the conversation were recorded and available for detailed analysis of speech patterns and lexical content. Assessments were offered at an interval (e.g., several times per week on the mobile device using a Likert scale measure of energy level, mood state, and concentration capacity similar to the self-report clinical monitoring form). A terminal assessment was performed at one year: repeat of the self-assessment evaluations from the PrBP clinical protocol and personality (NEO PI-R).

Example Smartphone Application Embodiments

Figure 2A:
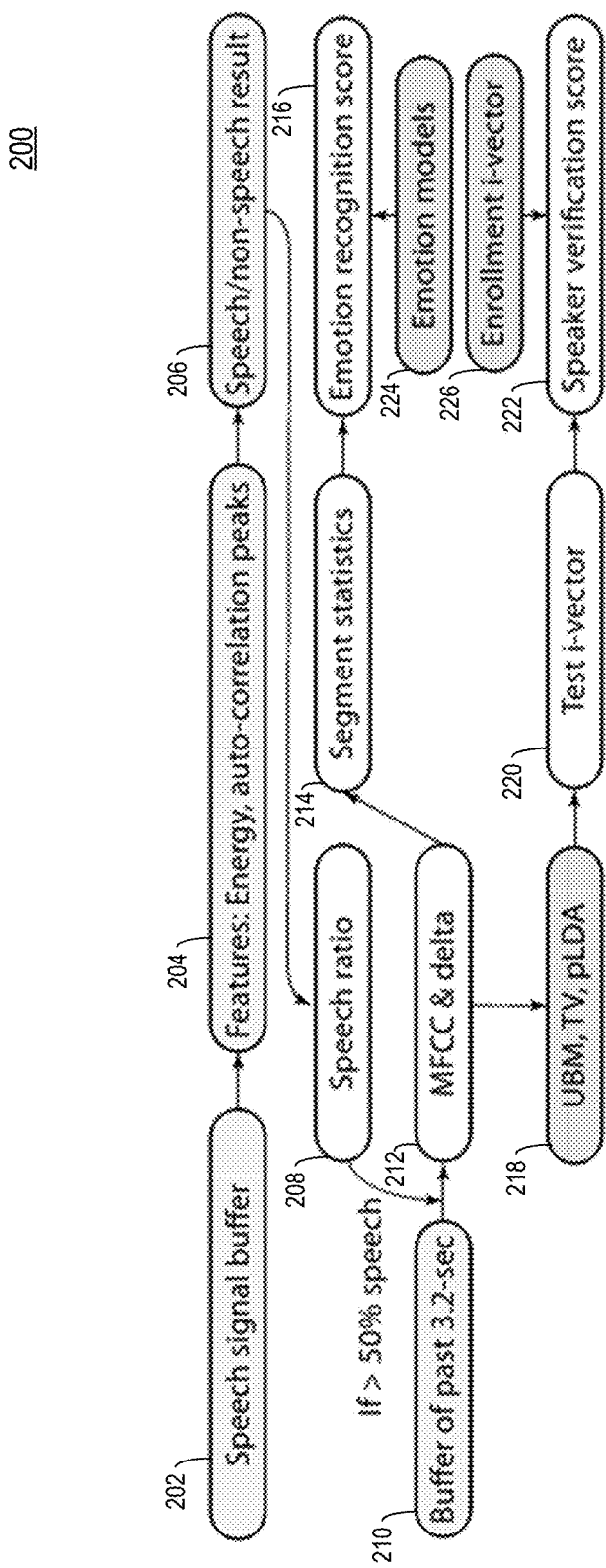
FIG. 2A depicts a social environment sensor pipeline, according to an embodiment.

FIG. 2A depicts a social environment sensor pipeline 200, according to an embodiment. The bubbles 202, 204, 206, and 210 of FIG. 2A may indicate basic speech processing, and the bubbles 218, 225, and 226 may indicate offline processing. In an embodiment, a method and system may include (1) a deployable smartphone app that captures audio from telephone conversations of a user (e.g., the user 108) and securely stores and transmits the audio data and (2) computational strategies to detect mood. The present techniques may include technology to measure emotion expressed and experienced using ambient microphone sensing and to predict mood from emotions and language measured from cellphone conversations and ambient audio. Expressed emotions may be measured in the ambient social environment. Ambient audio may be sampled to detect: (1) who is speaking, the participant or someone else (speaker verification) and (2) the valence and activation (emotion recognition). Together, these components may measure the emotions that an individual expresses and experiences. Speech activity detection (e.g., speech/non-speech) may be performed, as in bubble 206, and only speech regions are processed (e.g., when ratio of speech as computed at bubble 208 is above a set threshold).

The audio signal may be buffered, as depicted in bubble 210 FIG. 2A, to obtain windows of sound (e.g., 3.2 seconds). Speech features may then be extracted, and emotion classifiers and speaker verification may be employed. In some embodiments, computations for emotion and speaker inference may be performed in-the-app and on-the-fly due to the sensitive nature of these data. In some embodiments, algorithms may have a low memory footprint and may not be computationally complex. Model training may be performed offline.

Mel Frequency Cepstral Coefficients (MFCC) may be extracted from the audio data, as shown in bubble 212. For example, the first 13 MFCCs and first-order delta-coefficients may be extracted. For speaker verification, i-vectors (identity vectors) may be extracted from the MFCCs, as depicted in FIG. 2A. For emotion recognition, five statistics may be computed over the MFCCs and first-order deltas (e.g., mean, standard deviation, maximum, minimum, range), as shown in bubble 214. Speaker verification may be implemented as shown at bubble 218 using probabilistic linear discriminant analysis (pLDA) scoring 222 over i-vectors 220. First, a universal background model (UBM) may be trained and the total variation subspace (TV) may be calculated. Next, i-vectors may be extracted as shown at bubble 220 over three types of data: development, enrollment, and test. The development i-vectors may be from a general set of speakers that do not include the enrollment/test speakers. These data are used to train a Gaussian pLDA model. The enrollment i-vectors 226 may provide examples of what the test speaker(s) sound like, and may be used to build models 224 of the test speaker(s). The test i-vectors 220 may be examples over which the system is validated. Next, emotion recognition may be implemented using linear Support Vector Machines (SVM) as depicted in bubble 216. SVMs are effective in cross-corpus settings and may be efficiently deployed. Classifiers may be trained and validated on a corpus composed of publicly available emotion datasets, e.g., Interactive Emotional Dyadic Motion Capture (IEMOCAP) and MSP-Improv, an emotional audio data base of spontaneous improvisations.

Figure 2B:
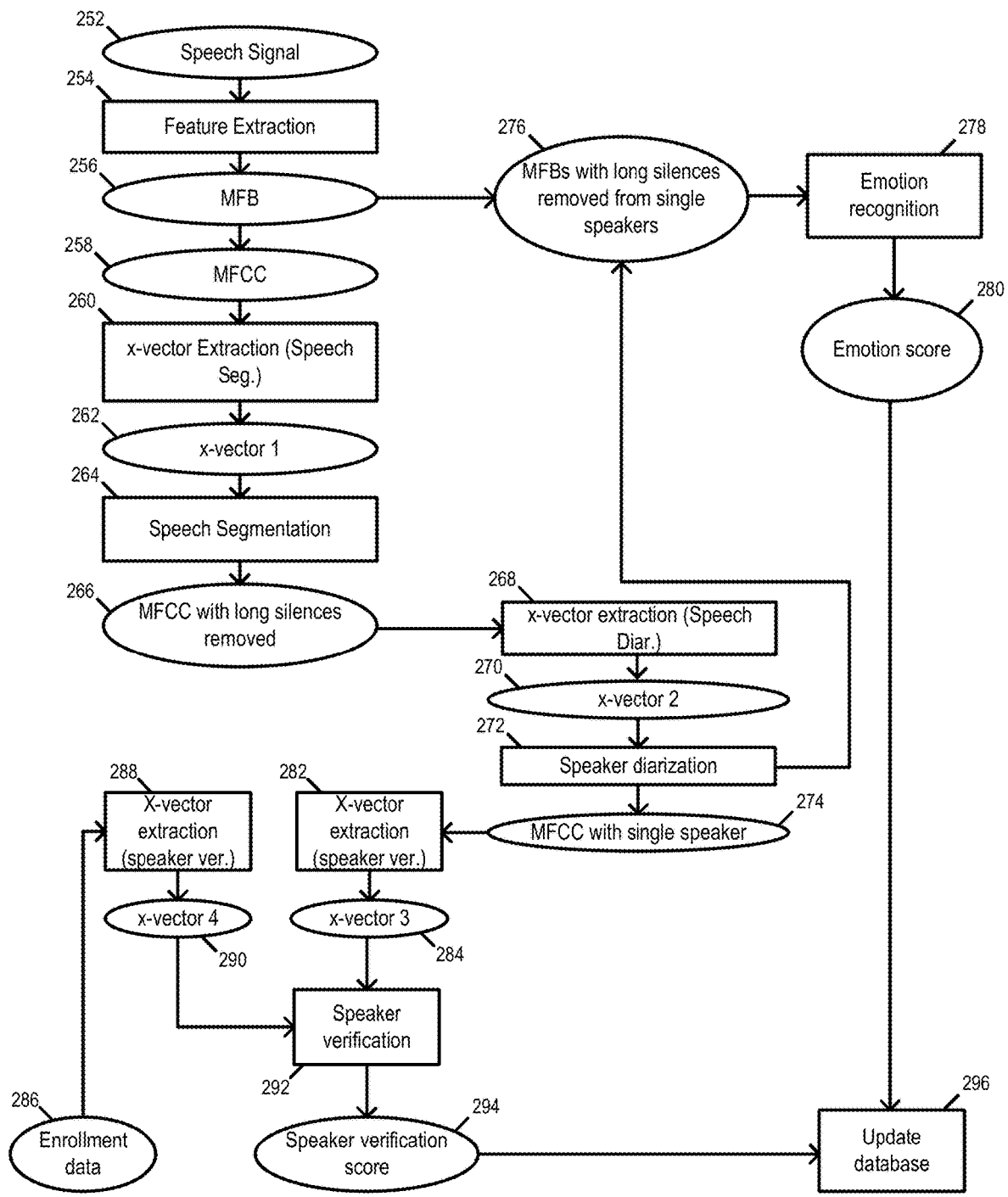
FIG. 2B depicts a flow diagram for emotion recognition using deep neural networks, according to an embodiment and scenario.

Emotion recognition 216 may also be implemented using other ML techniques (e.g., deep learning), as depicted in FIG. 2B. For example, instead of using i-vectors, some embodiments may implement x-vectors for implementing speaker recognition based on deep neural networks. X-vectors and other deep neural network approaches are more performant than i-vector embodiments, but may require larger volumes of labeled training data. The deep learning model may take the place of the SVM, in some embodiments. In some embodiments, a pre-trained model (e.g., from the Kaldi software platform) may be used in place of the UBM model.

The above-described embodiments may be chosen due to their small footprint and suitability for computation on mobile platforms. However, existing breakthroughs in deep learning that have dramatically increased system performance, even given real world data may also be used in some embodiments. Both components may be improved by choosing methods that ensure a small model footprint in terms of both battery life and memory.

In some embodiments, the smartphone app may be always on and may unobtrusively in the background (e.g., as a forked process and/or daemon process). Data (e.g., audio received/retrieved by a microphone of the smartphone running the smartphone app) may be encrypted in real time and uploaded after 24 hours to a central secure server (e.g., when the device is in a wireless environment). The smartphone may be any suitable smartphone (e.g., an iPhone, Android, etc.). The dataset may include one-sided natural conversations recorded during daily smartphone usage.

The smartphone has an app that runs silently in the background, recording the speech with 8 kHz sampling frequency, and uploading the recordings to servers for analysis.

Speech may be collected/recorded during a participant's (e.g., the user 108 of Figure) incoming calls (received) and outgoing calls (initiated). The smartphone app may only record the speech of the participant; it may not record any speech from the participant's conversation partner. Weekly clinical assessment calls described above may be included in an acoustics database. Self-report assessments may be gathered directly from the user's device (i.e., smartphone), programmed to be requested after a five-minute call, with a minimum of 24 hours between self-assessments. Based on previous data collection, ~1000 calls per participant may be expected over the study period. In some embodiments, a particular user's participation may be considered ongoing until a preset number of calls having minimum length is recorded.

In an embodiment, an existing application may be used to collect ambient audio. An ambient audio recorder within an Android application can provide scheduled recording from the ambient microphone and is designed to support "real life" (outside of a laboratory) recording conditions. The above-described clinical assessments may provide ground truth mood labels, describing how a clinician would characterize an individual's mood severity.

An emotion and language annotation and transcription pipeline (e.g., the pipeline 200 of FIG. 2A) may be used to support the development of emotion classifiers and speech recognition systems for the cellphone calls. Segments of contiguous speech may be extracted from both the personal and assessment calls, ranging in length from 3-30 seconds. A subset of the segments may be selected randomly, following a Gaussian distribution centered at the assessment call, wherein priority is placed on segments most closely associated with clinical assessment information. Listeners may be asked to either transcribe the speech (language) or to annotate the emotion content of the speech, rating their perception of valence and activation using a standardized rating system. Many segments (e.g., tens of thousands or more per year from study participants) may be transcribed and annotated, with at least one transcription and five emotion annotations per segment.

FIG. 2B depicts a method 250 of recognizing emotion from an audio speech input (e.g., ambient audio and/or conversation data, as discussed above) (block 252). The method 250 may include performing feature extraction (block 254). Feature extraction may include using OpenSMILE to extract an eGeMAPS feature set, including low level descriptors (LLDs) corresponding to frequency, amplitude, and spectral parameters. The method 250 may include encoding the features using a 40-dimensional log Mel Filter Banks (MFB) using a suitable speech recognition technique (e.g., the Kaldi speech recognition toolkit) (block 256). The method may include extracting MFCCs (block 258). The method 250 may include performing x-vector extraction (block 260) to obtain a first x-vector (block 262) segmenting the audio sample (block 264) and generating an MFCC with long silences removed (block 266). The method 250 may include performing x-vector extraction via speech diarization (block 268) to obtain a second x-vector (block 270) diarizing the MFCCs (block 272) and generating an MFCC of an individual speaker (274).

In some cases, the method 250 may include generating MFB features having long silences removed from individual speakers, after MFB encoding and/or after speaker diarization of the MFCCs (block 276). The method 250 may include analyzing the MFB features having long silences removed from individual speakers to perform emotion recognition (278). The method 250 may include generating an emotion score (block 280).

The method 250 may include performing x-vector extraction/speaker verification using the MFCCs corresponding to individual speakers (282) to generate a third x-vector (block 284). In some embodiments, the method 250 may include analyzing enrollment data (286) to perform x-vector extraction/speaker verification (288) to generate a fourth x-vector (block 290). The method 250 may include analyzing the third x-vector and/or the fourth x-vector to perform speaker verification (292). The method 250 may include generating a speaker verification score (block 294). The method 250 may include updating a database, such as the database 508 of FIG. 5 with the generated emotion score and/or the speaker verification score (block 296).

Figure 3:
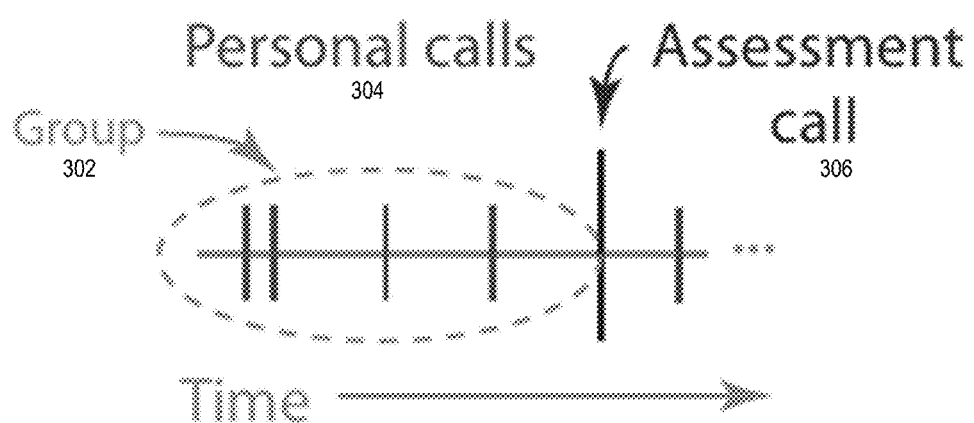
FIG. 3 depicts tracking different call types over a timeline, according to an embodiment.

FIG. 3 depicts call data 300 collected over time with respect to one or more users who may correspond to the user 108 of FIG. 1 (i.e., a group 302), the call data 300 including a set of personal calls 304 corresponding to the group and a set of assessment calls 306 corresponding to the group. Data corresponding to a user may be collected on HamD and YMRS scales retrospective over a week and for the day of the call, which may allow the association of all data (e.g., speech, mood, and social environment data) collected during a given week with the clinician-assessed HamD and YMRS scores. Such data may be labeled (1) continuously, associating data with the raw HamD and/or YMRS score and/or (2) discretely, associating data with a categorical score (e.g., euthymic, depressed, manic, or excluded).

The present techniques explore the relationship between mood state and emotion expression, which may necessitate access to a labeled corpus over which emotion can be detected and emotion classification algorithms can be validated. However, natural smartphone conversational speech datasets annotated in this manner were not available in the prior art. This limitation was overcome by generating a dataset containing manual valence/activation annotations of both the assessment calls 306 and the personal calls 304. A dimensional labeling strategy is disclosed, motivated by the concept of core affect. This construct provides a decontextualized manner of considering emotion expression. In an embodiment, the dataset includes natural conversational speech from subjects including, for example, hundreds of hours of calls. The selected subjects may be between the ages of 18 and 90 years old, and may be selected based on factors including: (1) BD diagnosis, (2) the type of device used for recording (for consistency); (3) provided informed consent for annotation of personal calls enabling the generation of ground-truth emotion labels.

The dataset may be created using: (1) segmentation, (2) segment selection, (3) segment inspection, and (4) segment annotation. Segmentation may include filtering calls whereby, for example, all recordings longer than one hour are excluded. Duration-based segmentation may be performed, for example, due to the large memory requirements and processing time associated with these data. Speech activity detection (SAD) may then be performed, using the COMBO-SAD algorithm introduced by Sadjadi and Hansen. Continuous segments may be formed such that the resulting segments contain continuous speech with no intermediate silence. For example, this segmentation procedure may provide many segments including the set of personal calls 304 and the set of assessment calls 306 (e.g., 167,339 segments comprising 10,563 segments from assessment calls 304 and 156,776 segments from personal calls 306 with the average length of 6.32 seconds).

Next, segments may be selected by identifying a subset of segments for manual annotation from the assessment calls 304 and personal calls 306. A first filter may be for segment length, to increase the likelihood that segments contain sufficient data to assess, but are not so long that the emotion would vary over the course of the segment. Segments shorter than three seconds and longer than 30 seconds may be excluded. Next, the personal calls 304 and assessment calls 306 may be sampled. Assessment calls 306 are important because they are the only calls that are directly associated with clinically determined mood labels. Personal calls 304 are important because they contain natural unstructured speech. Therefore, both may be sampled to ensure a diversity of examples. For each assessment call 304, up to ten random segments may be selected. For personal calls 306, sampling may be a function of proximity in time to assessment calls 304, preferring those that occur closer to the assessments. For example, calls on the day of assessment receive a weight of four (these are most closely linked to the HamD/YMRS score). Other calls receive a weight that reduces linearly up to 3 days before assessment day, calls outside this range have a weight of one. This selection procedure may result in many segments (e.g., tens of thousands) and thousands of segments from the assessment calls 304 and personal calls 306, respectively. It should be appreciated that the selection of segments and weights may vary, depending upon the needs of the embodiment.

Next, each segment may be manually inspected prior to annotation and removed if deemed inappropriate for the annotation task when, for example, (1) background noise dominates the speech signal, (2) speech content of the segment lasts less than two seconds, (3) subject is not talking to the phone (e.g., talking to someone else in the room), (4) emotion clearly varies over the course of the segment, and (5) segment contains identifiable information (e.g., name, address, phone number, etc.). Segment inspection may narrow the resulting segments (e.g., to 13,611 segments (25.20 hours)).

Segment annotation may then be performed, rating the activation and valence of the many speech segments using an established 9-point Likert scale (1: very low to 9: very high). A number of annotators of varying ages who are native speakers of English may perform the annotation task. A training session for each annotator may include a training video and manuscript, to introduce the annotation software and provide annotation examples. In the training session, annotators may be asked to consider several important points: 1. to only consider the acoustic characteristics of the recordings, not the lexical content, 2. to avoid letting speech content "color" their activation and valence labels, and 3. to consider the subject-specificity of emotion expression. When approaching a new subject, annotators may be asked to spend some time listening to a few segments without assigning a rating in order to get a better sense of what that person's baseline sounds like. The assessment of subject-dependent emotion patterns may be further supported by providing individual context for each participant. For example, annotation software may randomly select a participant and present all segments of that participant, in random order, to the annotator before moving on to the next participant's segments. In this way, annotators may consider participant-specific features to define emotion labels more accurately. A number of labels (e.g., two and six) for each segment may be collected.

Figure 4B:
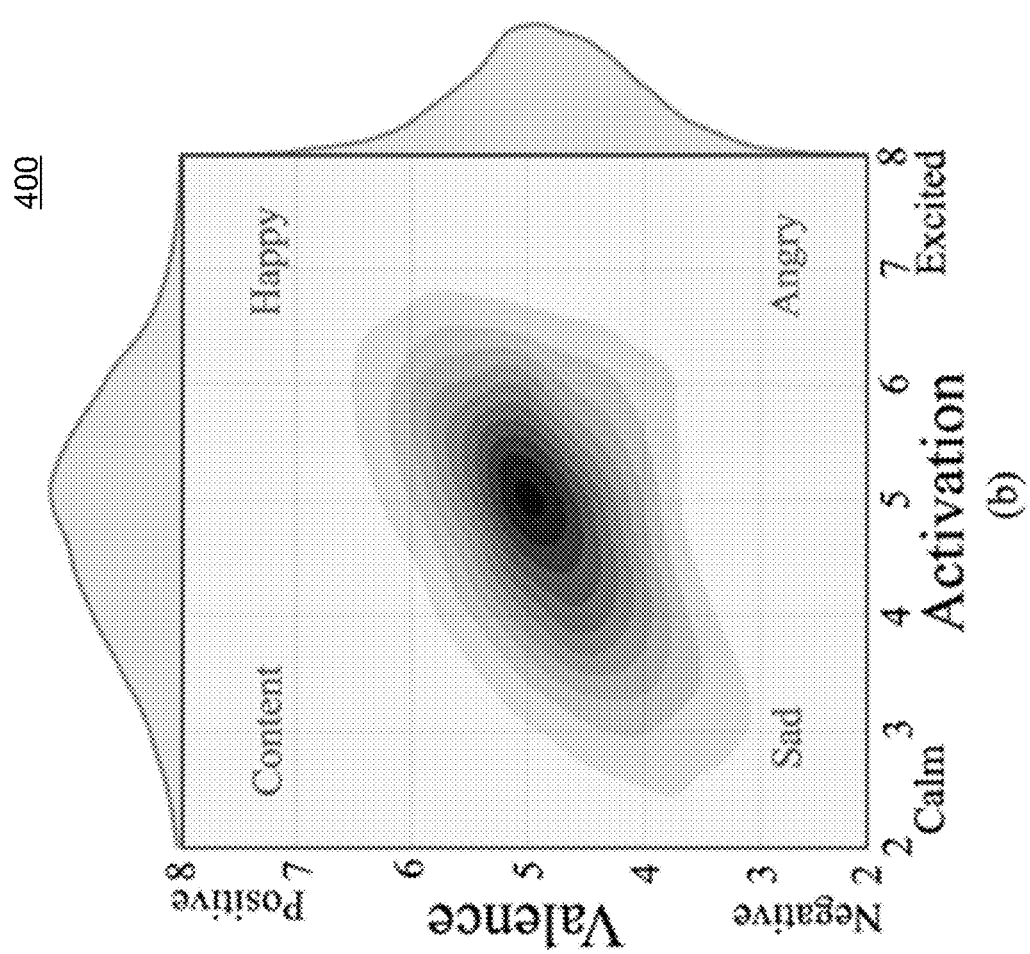
FIG. 4b depicts a distribution of activation and valence ratings, including categorical labels for reference points, according to an embodiment.
Figure 4A:
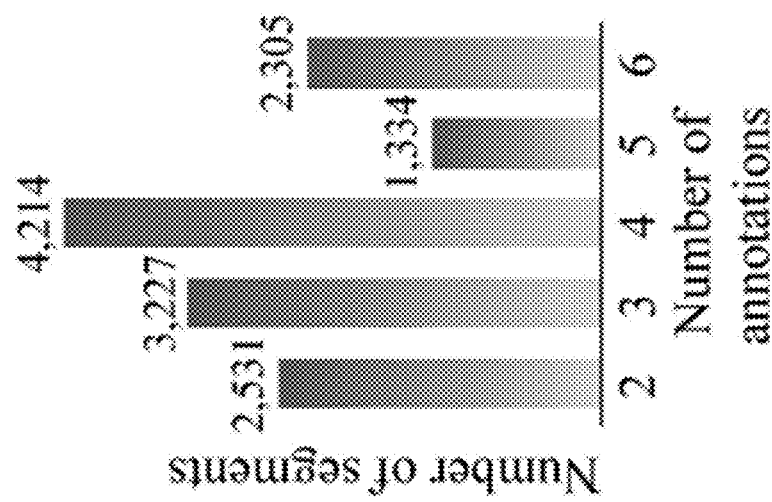
FIG. 4a depicts a distribution of labels annotated for segments.

FIG. 4A depicts a distribution of labels annotated for the segments discussed with respect to FIG. 3, and FIG. 4B depicts a distribution of activation and valence ratings, including categorical labels for reference points, according to an embodiment. FIG. 4A and FIG. 4B depict the distribution of the number of annotations for each segment, and a distribution of the activation and valence labels defined by the annotators. In some embodiments, the activation and valence values may be significantly correlated with each other (e.g., having a PCC of 0.46 ($p<0.01$)). In other embodiments, activation and valence are predicted from speech and the prediction is correlated with activation and valence at different levels of significance (e.g., having respective PCC of 0.712 and 0.405 or better, as discussed below). Regardless of their respective correlative properties, activation and valence are strong quantitative measures of emotion values.

The present techniques may include methods and systems for extracting mood-salient information from the audio data collected via the user's smart phone, and methods and systems for integrating this information with the ambient social environment information discussed above. The processing applied to the cellphone data may differ from the ambient audio data processing, because cellphone data may be stored and processed by high performance computing (HPC) systems, whereas ambient audio may be processed on the smartphone itself. However, in some embodiments, the cellphone audio data and ambient audio data may both be processed both in an HPC, or both in the smartphone.

In some embodiments, transcripts may be generated using automatic speech recognition (ASR) tools. A home-grown ASR system may be used due to privacy issues inherent in many of the commercially available general-purpose APIs (e.g., Amazon, Google, IBM). The home-grown ASR system may use a deep learning architecture, specifically a variant of Recurrent Neural Networks (RNN), called Long Short-Term Memory (LSTM) Networks and may be trained on an established training data set, the Fisher corpus, an approach that has achieved state-of-the-art results on benchmark ASR datasets. This model may be adapted using the transcribed data described above, and feature vectors may be augmented with i-vectors, which have been shown to improve ASR performance. Imperfect ASR transcription may be improved by using the N-best hypotheses (i.e., the list of likely possibilities of a series of words), derived from the output lattice. Language features may capture cognitive changes that are associated with mood and emotion. For example, the present techniques may characterize the sentiment and pronoun usage of expressed speech using Linguistic Inquiry and Word Count (LIWC). Speech patterns may be captured using N-Grams, contiguous sequences of n-words. For example, in the sentence, "I like fun games" a subset of the unigrams include "I" and "like", bigrams include "I like" and "like fun", and trigrams include "I like fun" and "like fun games". Language incoherency may be measured using graph analytics measures. Emotion may be described in terms of valence and activation, the same descriptors used in the characterizing an individual's social environment. Emotion may be estimated using Convolutional Neural Networks (CNN), multi-layered networks. These approaches may be augmented with attention mechanisms to identify emotionally meaningful information embedded within time-continuous signals.

The ambient emotion recognition system may provide sampled measures of a participant's emotional experiences throughout the day (e.g., every 10-minutes): ($v_{d,n}$, $a_{d,n}$), the n-th sample on the d-th day of valence (v) and activation (a). All entries may be collapsed into a distribution of emotion over a day or over a set time period (e.g., morning/afternoon/evening) and the recorded emotion can be treated as a time-series from which mood-salient events may be extracted. To classify mood, the mood of an individual during the day in which an assessment call is recorded may first be estimated. These days may be the most strongly associated with assessment call labels.

The speech and language features, described above, may be extracted over an entire phone call, and call-level summary statistics may be calculated (e.g., mean, median, upper/lower quantile, quantile range, standard deviation, skewness, and kurtosis). Mood may be estimated using a deep CNN classifier. As noted above, a "phone call" for purposes of the present techniques may also include collection of ambient sounds via a microphone in a way that is not directed by the user.

Features may be extracted from the measures derived from the ambient emotion signals, including measures of distributions and statistics over the recorded emotions. Mood using a CNN applied to the static emotion distributions or an LSTM applied to the ambient emotion time series.

Classifiers may initially be created for each modality (e.g., emotion, language, ambient emotion) individually, which may allow the measurement of the contribution of each modality to the final prediction. Decision-level fusion and feature-fusion within groups (e.g., fuse all features derived from the social environment) or over all modalities (e.g., fuse all features) may then be explored. In decision-level fusion, the output of the individual classifiers may be fused. This fusion may include the dual benefits of simplicity and interpretability because it can measure the degree to which each modality impacts the final prediction, but it may not take advantage of interactions between the individual streams. Feature-level fusion can be used to take advantage of features wherein each modality is jointly modeled. Traditional feature-fusion fusion approaches rely upon feature concatenation (i.e., creating a single large feature vector), element-wise addition, and element-wise multiplication. These methods may be compared to outerproduct and compact bilinear pooling approaches, which consider more comprehensive interactions between features. The merger of speech and language are discussed further herein.

After assessment, the present techniques may estimate how an individual will be assessed based on a week's worth of data (e.g., groups of calls 302 as defined in FIG. 3, including, for example, seven days' worth of personal calls 304, a single assessment call 306, and ambient emotion data). Bins may be created by day (e.g., day of assessment, day before, etc.) and bin-level features extracted to train a regression model and a CNN model to predict mood severity. The weights (regression) and regions of attention (CNN) may be analyzed to provide insight into how variation in speech and language are associated with mania and depression. Regions in time may be identified with consistent language and emotion patterns and regions in time that are in flux, inspired by work in change-point detection, to identify early warning signs. The distributions and the statistics of emotion patterns in regions of euthymia may be analyzed, and in change-points between euthymia and mania or depression.

There are other potential outcomes beyond HAMD/YMRS, including (1) daily self-report measures of mood (Mood 24/7): daily assessments of mood on 1-10 linear scale, (2) Behavioral features: the presence of behavior relating to eating, sexuality, thrill seeking and gambling etc., (3) Temperament/Personality: based on the Five Factor model of personality reflected in the NEO-PI, (4) Neurocognitive: information describing the cognitive capacity of the subject (e.g., 10, memory, executive functioning, fine motor abilities etc.), (5) Medication: how a person responds to medication, (6) All encounter, lab, and interactive data from the health/medical systems. Tracking emotion patterns will be a relevant associated parameter for all outcomes measures in BD as emotional variation is at the core of BD.

The effect of the environment on human health is profound and currently the estimates of environmental influences are class effects related to demographic and socioeconomicforces, in addition to clinical observations. The methods developed herein may be deployed in all areas of human research to develop quantifiable measures of the trajectory of the expressed emotions in relation to outcomes of human health and behavior.

Example Feed-Forward Neural Network Embodiments

In an embodiment, the present techniques were implemented with two emotion prediction methods/systems. The first system was a deep feed-forward neural network (FFNN) that operates on the Geneva Minimalistic Acoustic Parameter Set (eGeMAPS) feature set. The second method/system was a convolutional neural network (CNN) classifier that operated on log Mel-frequency bank (log-MFB) features. The eGeMAPS feature set is a carefully designed standardized acoustic feature set for affective computing. It is an 88-dimensional feature vector that includes features relating to energy, excitation, spectral, cepstral, and dynamic information. It should be appreciated by those of skill in the art that the set of features used to predict certain conditions (e.g., BD) may differ from those features used to predict other conditions (e.g., major depressive disorder).

Herein, the eGeMAPS feature set may be extracted using an open source toolkit or another suitable method (e.g., using the openSMILE toolkit with default parameters). Previous research has demonstrated that log melfrequency bank (log-MFB) spectral features may outperform other temporal frame-level acoustic features such as MFCCs. The implementation included extracting 40-dimensional log-MFB features with 25 ms frame length and 10 ms frame shift using the Kaldi toolkit. Global z-normalization was performed on all features. Unlike eGeMAPS that is a fixed-length feature vector for each recording, log-MFB has a variable length proportional to the length of the recording. Training a neural network with a variable-length input is problematic; the network structure must be consistent with the input length while the length varies for different recordings. The example embodiment used the zeropadding technique to avoid this problem.

In one embodiment, the deep FFNN included a stack of fully-connected dense layers with an activation function (e.g., a sigmoid, hyperbolic tangent, and/or rectified linear unit) followed by an output layer with a linear activation function. Activation and valence values were predicted independently. A Cony-Pool network was implemented due to its high emotion recognition accuracy on the IEMOCAP and MSP-IMPROV datasets. The Cony-Pool network included three major components: (1) a stack of convolutional layers; (2) a global pooling over time layer; and (3) a stack of dense layers. The convolutional layers created a sequence of feature maps that identify emotionally salient regions within variable length utterances. The global pooling layer automatically extracted a set of call-level statistics. The stack of dense layers predicted the labels from the call-level features. ReLU and linear activation functions were used for intermediate and output layers.

In operation, the ground truth annotation for a segment was computed as an average of all individual annotations. These ground truth labels were normalized by subtracting the rating midpoint of 5 and scaling to the range of [−1,1]. Let x be a rating, the normalization was performed through (x−5)/4. This transformation helped the network(s) to learn the bias and standard deviation of the labels more quickly. System performance was measured using a repeated cross-validation method. Each experiment was repeated for five total runs, where a run was defined as, for example, six randomly selected folds. In each run, the folds were shuffled by randomly assigning two subjects to each of the six folds. Round-robin cross-validation was then applied: at each step, one fold (two subjects) was assigned to testing, one used for tuning parameters and early stopping, and the rest for training. This procedure generated one test measure per fold, resulting in six measures. Over the course of the five runs, a matrix of 6-by-5 test measures was output. The mean over all experiments was the experiment mean, and the experiment standard deviation the mean standard deviation within runs. Significance was determined using a repeated cross-validation paired t-test with six degrees of freedom. In some embodiments, the network(s) were implemented using Keras and/or TensorFlow. Root mean square error was optimized during training using an optimizer (e.g., Adam, NAdam, etc.) with a fixed learning rate of (e.g., 0.0001). Weights were initialized using an algorithm (e.g., the Xavier uniform algorithm) and all bias parameters were set to zero. An epoch size was chosen (e.g., 64).

To train the FFNN, cross-validation was performed to tune the number of dense layers (e.g., 2, 4, 8) and the number of nodes in each layer (e.g., 200, 400, 800). To train the Cony-Pool network, a number of initial convolutional layers and a final dense layers were set to an equal value and validated them over a set (e.g., 2, 3). The number of nodes (e.g., 200,400) and the length of the convolution kernels (e.g., 4, 8) were validated. The FFNN and Cony-Pool networks were trained for 100 and 15 epochs, respectively.

For each test fold, the best epoch was selected, and the best network structure based on the validation concordance correlation coefficient (CCC) value. In some embodiments, three popular metrics were selected to compare the resulting networks: PCC, CCC, and RMSE. Using Cony-Pool, a respective PCC of 0.712 and 0.405 for activation and valence (or better) was achieved, and Cony-Pool demonstrated significantly better performance than FFNN using all measures except RMSE, as depicted in the following table:

| | | |
|---|---|---|
| Activation CCC | 0.593 ± 0.071 | 0.660 ± 0.090 |
| Activation RMSE | 0.207 ± 0.01 | 0.201 ± 0.028 |
| Valence PCC | 0.271 ± 0.053 | 0.405 ± 0.062 |
| Valence CCC | 0.191 ± 0.031 | 0.326 ± 0.052 |
| Valence RMSE | 0.199 ± 0.015 | 0.194 ± 0.016 |

The above results of the emotion prediction systems demonstrate the importance of modeling temporal characteristics of speech in emotion recognition. In particular, the bolded results indicate that the cony-pool method is significantly better than FFNN, using a paired t-test with p<0:01, in the constraints tested. The lack of improvement for RMSE may be due to the fact that RMSE places more weight on selecting the correct bias of the ratings. It should be understood/appreciated that subject-dependent or speaker-adapted models may improve RMSE. In general, activation is easier to predict from speech than valence.

Example Predictive Testing of Bipolar Disorder Mood States and Predicted Emotion In an embodiment, the link between BD mood states and predicted emotion was tested by implementing the Cony-Pool models to predict emotion on a number of assessment call segments (e.g., 10,563 segments). A number of different models (e.g., 30) from the repeated cross-validation were used as an ensemble, wherein the mean output was taken. The predicted emotion labels were normalized using subject-dependent euthymic z-normalization. This analysis demonstrated the importance of considering how a subject varies about his/her own baseline, which is defined as his/her euthymic periods. The mean and standard deviation of the valence/activation ratings over all calls associated with euthymic mood states were also calculated, and each segment normalized based on these values, reducing the effect of subject biases. The following table depicts example mean activation and valence ratings, calculated over the segments in each of the different mood states:

| | Subject | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Mean activation (mania) | −0.12 | 1.06 | 1.56 | 0.45 | −0.13 | −0.03 | 0.73 | 0.02 | 1.35 | −0.86 | — | — |
| Mean activation (depression) | 0.05 | 0.72 | 0.66 | 0.35 | −0.25 | 0.32 | 0.89 | −0.02 | 0.55 | −0.60 | — | — |
| Mean valence (mania) | 0.05 | 0.72 | 0.66 | 0.35 | −0.25 | 0.32 | 0.89 | −0.02 | 0.55 | −0.60 | — | — |
| Mean valence (depression) | −0.42 | −0.98 | 0.13 | −0.08 | −0.31 | −0.37 | 0.37 | −0.27 | −1.39 | 0.05 | 0.00 | −3.13 |

The above table depicts subject-specific mean activation and valence ratings for manic and depressed states, according to an example embodiment. Dashes indicate that the subject did not have any manic episodes. Bold font indicates statistically-significant differences between manic and depressed states (t-test, p<0.01).

The following table shows the PCC between each of the dimensional emotion ratings (activation and valence) and each of the mood ratings (YMRS and HamD). Specifically, the table depicts PCC between each emotion rating and mood state. Even subjects without manic episodes are included in this analysis, as YMRS ratings are available for those subjects. Significant correlations are bolded (t-test, p<0.01):

| | Subject | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| PCC of Activation and YMRS | −0.02 | 0.46 | 0.19 | 0.04 | 0.11 | 0.06 | 0.13 | 0.19 | 0.08 | −0.18 | 0.39 | 0.55 |
| PCC of Activation and HamD | −0.11 | −0.13 | −0.25 | −0.11 | −0.04 | −0.10 | 0.04 | −0.10 | −0.57 | −0.11 | −0.16 | −0.80 |

-continued

| | Subject | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| PCC of Valence and YMRS | 0.00 | 0.44 | 0.17 | 0.00 | 0.08 | 0.13 | 0.19 | 0.20 | −0.04 | −0.14 | 0.40 | 0.55 |
| PCC of Valence and HamD | −0.10 | −0.13 | −0.33 | −0.10 | −0.06 | −0.13 | 0.09 | −0.10 | −0.52 | −0.05 | 0.09 | −0.76 |

In the depicted embodiment, with respect to the majority of subjects, the mean of both emotion ratings during manic states was more positive and activated compared to the corresponding within-subject ratings during depressed states. Significance was determined by a t-test with p<0.01.

The results of the above-described implementation provide evidence that emotion behavior is effective for predicting/modeling mood states. For almost all subjects, activation and valence were significantly positively correlated with YMRS and significantly negatively correlated with HamD (p<0.01). This supports the hypothesis that heightened mood states come with heightened emotions. Even after normalizing each subject by his/her euthymic segments, the distribution of emotion ratings between subjects were significantly different (using a one-way ANOVA with p<0.01). For the depicted embodiment, a Tukey-Kramer posthoc test of the 66 possible pairwise subject comparisons was applied, to demonstrate activation found to be significantly different in 51 cases and valence found to be significantly different in 48 cases (p<0.01). Notably, the experiments did not show a correlation between the within-call variance of emotion ratings and mood states.

Example System Diagram

FIG. 5 depicts an example system 500 for implementing the present techniques, according to some embodiments. System 500 may include a mobile device 502 having a central processing unit (CPU) 502A, a memory 502B, a program module 502C, a network interface controller (NIC) 502D, an input device 502E, and/or a display device 502F. System 500 may also include a network 504, a remote computing device 506, and a data store 508.

The CPU 502A may include any number of processors, possibly including one or more graphics processing unit (GPU). The memory 502B may include a random-access memory (RAM), a read-only memory (ROM), a hard disk drive (HDD), a magnetic storage, a flash memory, a solid-state drive (SSD), and/or one or more other suitable types of volatile or non-volatile memory. The program module 502C may be stored in the memory 502B and/or loaded into the memory 502B, in some embodiments. For example, the program module 502B may include executable instructions for training ML model(s), operating ML model(s), collecting data (e.g., audio data, timestamps, location information etc.), processing the data, transmitting the data, storing the data, and playing back the data. The executable instructions may be stored in memory 502B. In some embodiments, the memory 502B may include executable instructions that, when executed, cause the mobile computing device 502 to store ambient audio in a memory of the computing device 502 and/or to transmit the ambient audio via a computer network. The NIC 502D may include one or more physical networking devices (e.g., an Ethernet device, a wireless network controller, etc.). The NIC 502D may allow the mobile device 502 to communicate with other components of the system 500 (e.g., the remote computing device 506) via a computer network (e.g., network 504). The input device 502E may include one or more peripheral device such as a detached keyboard or mouse, or an integral device such as a capacitive touch screen of a portable computing device. The input device 502E may include one or more microphone, in some embodiments. The one or more microphone may be integral to the mobile device 502 (e.g., a microphone built into a smartphone) or communicatively coupled to the mobile device 502 (e.g., communicatively coupled to the mobile device 502, as in a separate/standalone microphone device). A microphone device may be, respectively, unidirectional or omnidirectional and may include onboard storage/processing, and/or active/passive noise cancellation features. The output device 502F may include a suitable display device such as a computer monitor, capacitive touch screen, television screen, speaker, etc. The input device 502E is capable of recording audio corresponding to a phone call and/or ambient audio. For example, a first microphone may store audio including utterances of a user of the mobile device 502. A second microphone may store ambient audio (e.g., audio in the environment of the mobile device 502, that may include the voice of the user and/or other sounds) in the memory 502B. The ambient audio and/or voice call data may be analyzed, as described in more detail below.

The mobile device 502 may be any suitable mobile computing device (e.g., a smart phone, a tablet, a wearable device, etc.) and in some embodiments, the mobile device 502 may connect to other components of the system 500 via the network 504. Although the network 504 may be a wireless network of a consumer network provider (e.g., a Global System for Mobile communication (GSM) provider or Code Division Multiple Access (CDMA) provider), in some embodiments the carrier network 504 may be a private wireless network. Mobile device 502 may send data to and receive data from the network 504 via any suitable means (e.g., via HTTP request/response). In some embodiments, the network 504 may include an Internet Service Provider (ISP) such as a Tier 1 and/or Tier 2 network. In some embodiments, the network 504 may include the Internet and/or another suitable network (e.g., a local area network (LAN), a metropolitan area network (MAN), a wide area network (WAN), a mobile, a wired or wireless network, a virtual private network (VPN), etc.).

Additional components of the system 500 may include a remote computing device 506 and a database 508. The remote computing device 506 may include a central processing unit (CPU) including any number of processors, possibly including one or more graphics processing unit (GPU); a memory including a random-access memory (RAM), a read-only memory (ROM), a hard disk drive (HDD), a magnetic storage, a flash memory, a solid-state drive (SSD), and/or one or more other suitable types of volatile or non-volatile memory; a program module stored in the memory and/or loaded into the memory; a network interface controller (NIC) including one or more physical networking devices (e.g., an Ethernet device, a wireless network controller, etc.); an input device including one or more peripheral device such as a detached keyboard or mouse, or an integral device such as a capacitive touch screen of a portable computing device, and/or a microphone; and/or a display device (e.g., a computer monitor, speaker, etc.).

The program module of the remote computing device 506 may include executable instructions for training ML model(s), and/or operating ML mode(s), in accordance with the principles discussed above. The program module of the remote computing device 506 may include executable instructions for collecting data (e.g., audio data, timestamps, location information etc.), processing the data, transmitting the data, storing the data, and playing back the data. The NIC of the remote computing device 506 may allow the remote computing device 506 to communicate with other components of the system 500 (e.g., the mobile computing device 502) via a computer network (e.g., network 504). One or more microphone of the remote computing device may be integral to the remote computing device 506 or communicatively coupled to the remote computing device 506 (e.g., communicatively coupled to the mobile device 502).

The remote computing device 506 may be implemented as any suitable computing device such as a dedicated hardware computing device (e.g., a server), a virtualized instance of a server (e.g., a cloud computing server), a hypervisor, etc. In some embodiments, the remote computing device 506 may be implemented as a mobile computing device (e.g., a laptop, tablet, smart phone, wearable device, etc.).

The data store 508 may be a relational database (e.g., MySQL), a NoSQL database, a flat file database, a distributed database, a standard partition formatted using a suitable filesystem (e.g., Ext4), and/or any other suitable data storage mechanisms. In some embodiments, the data store 508 may be provided by a cloud computing resource (e.g., a cloud storage API or virtualized database). In general, any of the components of system 500 may be implemented in a private cloud computing environment and/or a public cloud computing environment, as dictated by the needs of certain embodiments. A user may interact directly with the mobile device 502 and/or the remote computing device 504.

In operation, a user may be provided with a smartphone, as discussed above. The smartphone may correspond to the mobile device 502. The user may transmit outgoing communication and/or receive incoming communication via the mobile device 502. For example, the user may place and/or receive telephone calls, and/or the user may send and/or receive text messages. An application comprising executable instructions in the program module 502C of the mobile device 502 may be installed. In an embodiment, the application may execute the instructions periodically to activate the input device 502E (e.g., receive/retrieve audio data from a microphone) of the mobile device 502. The instructions may cause the audio data from the input device 502E to be recorded in a storage device of the mobile device 502 (e.g., the audio data may be written to a timestamped file in the memory 502B of the mobile device). In an embodiment the application may continuously record audio data. In an embodiment the application may record audio data at a pre-set schedule. In an embodiment the application may record audio data in response to the occurrence of one or more event (e.g., the initiation of a telephone call, the receipt of a telephone call, the conclusion/hangup of a telephone call, etc.). Such events may be recognized and programmatically detected using appropriate OS-level and/or application-level programming interfaces, as will be appreciated by those of skill in the art.

In an embodiment, the application may cause data received by/retrieved from the input device 502E to be sent (e.g., via a streaming/buffered network connection) via the network 504 to the remote computing device 506. In an embodiment the application may send data to the remote computing device periodically (e.g., every six hours and/or when the mobile device 502 is plugged in to a power outlet, with range of and associated with a wireless router, etc.). In an embodiment, the mobile device 502 may include instructions for deleting data sent to/retrieved by the remote computing device 506. In some embodiments, the data recorded by the mobile device 502 may be encrypted to preserve the privacy of the user. Data stored in the mobile device 502 may be transmitted to the remote computing device 506 via the network 504.

Once data from the input device 502E is received by/retrieved by the application executing the mobile device 502, one or more ML model may have already been trained. The remote computing device 506 may have trained the one or more ML model. For example, as discussed above, an ML model for user identification (user ID ML model) may have been trained. The trained user ID ML model may be transmitted from the remote computing device 506 to the mobile device 502 via the network 504 and stored in the memory 502B of the mobile device 502, and executed in the program module 502C of the mobile device 502. In an embodiment, data from input device 502E may be passed as input to the user ID ML model, wherein the user ID ML model determines whether the audio corresponds to one or more known user. In an embodiment, the output of the user ID ML model may be a boolean (e.g., Mary=True, Mary=False). In another embodiment, the output of the user ID ML model may be a scalar value representing the likelihood that the user is Mary. In another embodiment, the output of the user ID ML model may be a set of values $U_1$-$U_n$ wherein each value of U represents the likelihood, confidence, and/or probability that the data recorded (e.g., voice data) corresponds to that particular user. A separate model may be trained for each user U in some embodiments.

In some embodiments, language expressed in calls may be used to determine clinical mood ratings. For example, a voice-to-text module may extract language of the user and a separate ML model may be trained to analyzed the extracted language (e.g., English text) to determine a linguistic sentiment/emotion. The linguistic sentiment may be used in conjunction with emotion state information from the FFNN. The context of the output of each ML model may be analyzed, to determine a description of activation and valence throughout a longer period (e.g., a day, month, or year) corresponding to a user, including the emotions expressed by and experienced by, the user.

As discussed above, an FFNN may be trained that operates on the eGeMAPS feature set. The present techniques may include instructions for extracting the acoustic features relating to energy, excitation, spectral, cepstral, and dynamic information comprising the eGeMAPS feature set. In an embodiment, the features may be extracted from audio data in the mobile device 502 and transmitted via the network 504. In that case, the audio data may not be saved, and only the acoustic features may be saved for later analysis.

Although the FFNN may be trained to analyze eGeMAPS features directly, in some embodiments, a ML model may be trained to analyze audio waveforms directly without feature extraction.

In an embodiment, a separate BD ML model may be trained, in accordance with the principles discussed above. The BD ML model may output an activation rating and/or a valence rating based on analyzing the voice data collected and/or processed by the mobile device 502. The activation and valence ratings may be used to provide immediate feedback to a user, in an embodiment. For example, the mobile device 502 may include instructions for analyzing the valence and/or activation feedback to determine the user's current mood state, and/or long-term mood state. Whether the user is experiencing mania or depression, and the extent to which the user is experiencing either, may be displayed to the user. The current trend of the user toward any particular mood state may be displayed, in some embodiments.

Example Flow Diagram for Predicting Mood State of a User

Figure 6:
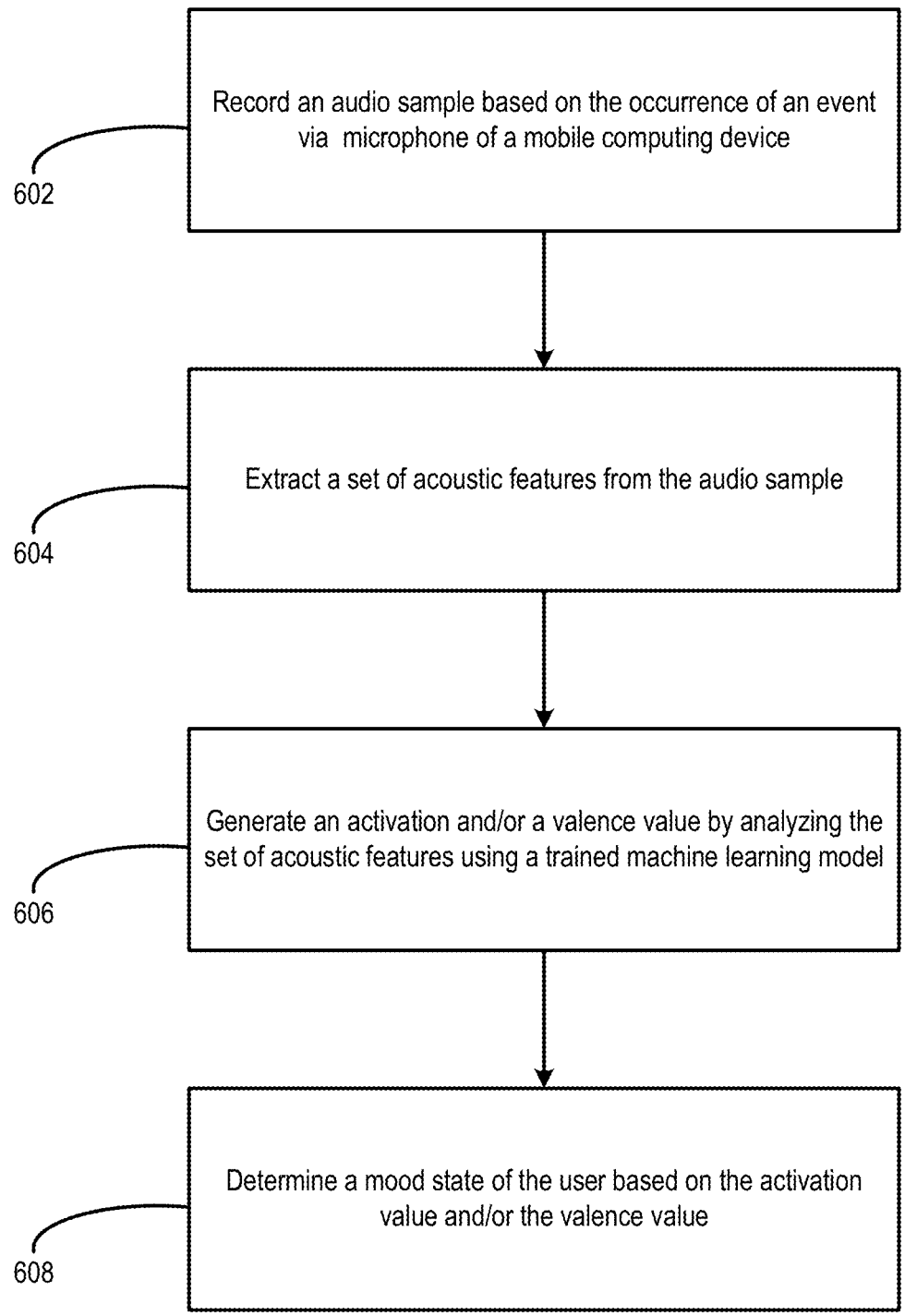
FIG. 6 depicts a flow diagram for a method of predicting a mood state of a user, according to one embodiment and scenario.

FIG. 6 depicts an example method 600 of predicting a mood state of a user, according to one embodiment and scenario. Method 600 may include recording an audio sample based on the occurrence of an event via a microphone of a mobile computing device (block 602). The audio sample may include telephone call audio and/or ambient audio. The recording may be performed by the mobile device 502 (e.g., by instructions executing program module 502C). As discussed above, the event may be a call-related event, such as an incoming call, a user's answering of an incoming call, a user's placing of an outgoing call, etc. The event may also be time-based. For example, ambient audio may be recorded at a predetermined interval (e.g., every few seconds, minutes, hours, etc.). The event may correspond to an ambient audio trigger, wherein a computing device such as the mobile device 502 captures/records/stores ambient/environmental audio in response to an executable instruction stored in the mobile device 502 and/or in response to receiving/retrieving data (e.g., an API call, a REST call, a SOAP call, etc.) from an external computing device (e.g., the remote computing device 506). Those of skill in the art will appreciate that any suitable audio may be collected, at any suitable interval, via any suitable means.

Method 600 may further include extracting a set of acoustic features from the audio sample (block 604). The feature extraction may be performed by the mobile device 502 or the remote computing device 506. For example, as discussed above, MFCC or another suitable set of audio features may be extracted from the audio sample. For example, the pitch, jitter, loudness, harmonics-to-noise ratio, etc. may be measured with respect to each audio sample. Such features may be associated with a corresponding sample by storing the features in an electronic database (e.g., the data store 508) or another suitable location. It should be appreciated that the features analyzed may differ, depending on the outcomes that are of clinical concern. For example, if activation and/or valence are being used to determine a user's mood state (e.g., level of mania/depression in connection to a bipolar disorder assessment), then a first set of features may be analyzed. If the assessment relates to another disorder, then a second set of features may be analyzed. Additionally, as discussed above, the architecture and/or training of the ML model may change, depending on the clinical outcome under analysis.

Method 600 may include generating an activation value and/or a valence value by analyzing the set of acoustic features using a trained ML model (block 606). The valence value may be stored, displayed, transmitted, and/or used as input for additional modeling. Activation and valence values may be represented in any suitable format. For example, activation values and valence values may be values represented by real numbers on a respective activation scale and a respective valence scale.

Method 600 may include determining an emotion state of the user based on the activation value and/or the valence value (block 608). The emotion state may include a diagnostic boolean (bipolar/non-bipolar) or scalar value representing a correlation coefficient corresponding to manic and/or depressed states. Pre-determined thresholds may be applied to the output of the ML models. In some embodiments, many calls/ambient recordings corresponding to a single user may be analyzed to predict emotion. For example, ten thousand or more recordings of a user, each several seconds in length, may be analyzed. The valence and/or activation ratings may be measured with respect to each call, and the mean and standard deviation amongst all of the analyzed calls, as discussed above.

Further Linguistic Analysis Embodiments

As noted above, the present techniques may include using linguistic analysis and/or acoustical analysis to determine emotional variability. In general, this means that emotional variability may be determined by analyzing linguistic content of an audio sample, such as words, phrases, etc. and/or tones of an audio sample, such as variations in pitch, jitter, loudness, harmonics-to-noise ratio, etc. In general, linguistic analysis includes the steps of data pre-processing (e.g., transcription and/or segmenting, and call selection), feature extraction, and data modeling.

For example, speech features such as speaker timing patterns and language usage may be analyzed. Timing features may include attributes such as the number of speaking turns and average speaking length. A data set such as PRIORI may be used, as discussed above. Call data may be recorded as discussed above. Calls may be transcribed and/or segmented. In some embodiments, calls are segmented using an ASR model. The ASR model may be implemented in Kaldi, for example. A subset (e.g., 100) of words and/or speech segments may be selected. Then, a set of speech features may be identified. The speech features may have significance in clinical studies of BD symptoms. The speech features may be computed by applying statistics.

In some embodiments, speech intelligibility may be analyzed by extracting statistics from segment-level ASR. Some ASR techniques may be correlated with higher confidence when analyzing well-enunciated speech. Call-level features may be produced by factoring ASR confidence in to call transcription. Out-of-vocabulary words may also be counted as a proportion.

In some embodiments, non-verbal behavior may provide information regarding emotion and psychological well-being. For example, counts of laughter and/or noise detected during ASR may be collected. In some embodiments, the counts may be normalized by a total word count.

In some embodiments, one or more feature sets may be generated that capture linguistic style. First, syntax may be generated. For example, as discussed above, the LIWC dictionary may be used to compute normalized counts of: (1) Part of Speech (POS) categories (e.g. first person pronouns, adverbs) (2) verb tenses (e.g. past, present), (3) swear words, (4) non-fluencies (e.g "hmm", "um"), and (5) fillers (e.g. "you know"). The 18 POS measures included in LIWC may be combined with 5 additional POS categories derived using the Natural Language Toolkit (NLTK) POS tagger and with 13 POS ratio features (e.g. adjective:verbs). Second, speech complexity and verbosity may be computed. For example, statistics may be computed from the number of words and syllables present in each speech segment. Mean word length and the fraction of long words (6+ characters) may be used as features. Third, speech graphs may be created to measure thought disorder and/or psychosis. Thought disturbances, such as rumination, may be present in individuals with depression, and graph measures may be used to capture those disturbances. Calls may be represented graphically using each unique word as a node. An edge may be inserted for every pair of words uttered consecutively within the same speech segment. Each call may be transformed into three graphs: (1) uses the words directly, (2) uses the lemmatized form of each word, and (3) represents each word as its associated POS. Graph attributes may be used as features, including average degree, density, diameter, the size of connected components, and loop, node, and edge counts. A version of each feature that is normalized by total word count may be included.

In some embodiments, semantic content may be identified. For example, LIWC may be used to measure the presence of psychologically meaningful categories, such as emotion (e.g. anger, anxiety), biological processes (e.g. body, health), and personal concerns (e.g. work, death). In another example, Term Frequency Inverse Document Frequency (TF-IDF) features may be used to encode the use of specific words. A vocabulary using all calls in a data set (e.g., the PRIORI dataset) may be collected, and all unigrams present in a number (e.g., 10+) calls and all bigrams present in a number (e.g., 50+ calls) collected, resulting in a set of n-grams. When computing TF-IDF values, term frequency may be normalized by total word count.

Speaker timing may be determined in some embodiments. For example, Kaldi may be used to generate aligned word and phone timing annotations for each call. The following features for words, phones, and pauses may be extracted: (1) statistics over the durations of all instances (e.g. mean word duration), (2) statistics over the per second timing within all segments (e.g. mean words per second across segments), (3) total count (e.g. number of words), and (4) overall per-second timing (e.g. words per second). Other features that may be extracted include total call duration, total participant speaking duration, ratio of participant speaking duration to total duration, total pause duration, ratio of pause duration to total duration, segment count, segments per minute, count of short utterances (lasting less than 1-second), and short utterances per minute.

In some embodiments, a linear regression model is used to detect mood irregularities. Performance may be assessed using leave-one-subject-out (LOSO) cross-validation. For each fold, the training data may be used to eliminate all features that do not have statistically significant PCC with ground truth depression ratings. A p-value of 0.01 may be used as a cutoff for all features aside from the TF-IDF features. The number of TFIDF features may exceed that of other features. A cutoff may be applied to the TF-IDF features to create a balance between the feature sets and to avoid spurious correlations that may arise from performing a large number of statistical tests. The remaining features may be ordered by magnitude of correlation. A second (nested) stage of LOSO cross-validation may be performed over the training speakers with sufficient mood examples, to select the best number of features with respect to this ranked list. Performance may be evaluated using the PCC between the predicted and target scores. For example, following is a table of features selected by a TF-IDF model on assessment calls, including mean and standard deviation of model coefficients:

| Feature | β | Feature | β |
| --- | --- | --- | --- |
| yes | 2.3 ± .49 | people | .84 ± .16 |
| good | −1.14 ± .35 | bad | .61 ± .18 |
| normal | −1.12 ± .28 | hand | .60 ± .21 |
| yeah | .93 ± .14 | nope | −.56 ± .15 |
| really bad | .90 ± .10 | every day | .42 ± .33 |

In the end, the model detects individual-specific mood irregularities, and enables caregivers to determine the relative symptom severity of an individual at two or more points in time. The modeling approaches discussed above may be used in a clinical setting and/or a non-clinical setting to detect depression severity. It will be appreciated that the model created may be of a different type (e.g., a Deep Neural Network). Also, in some embodiments, a model may include both linguistic analysis and acoustic analysis techniques.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of improved quantitative predicting of a mood state of a user, the method comprising:
   (1) based on an occurrence of an event, recording, via a microphone of a mobile computing device of the user, a digital audio sample;
   (2) extracting, via one or more processors, from the digital audio sample, a set of acoustic features;
   (3) generating one or more dimensional emotion values, by analyzing the set of acoustic features using a machine learning model trained by processing a longitudinal set of labeled assessment call segments; and
   (4) determining, based on the one or more dimensional emotion values, the mood state of the user.

2. The method of claim 1, wherein the event relates to either (i) an initiation of an outgoing telephone call, (ii) an acceptance of an incoming telephone call, or (iii) an ambient audio trigger.

3. The method of claim 1, wherein recording the audio sample includes one or both of (i) storing the audio sample in a memory of the mobile computing device of the user, and (ii) verifying an identity of the user.

4. The method of claim 1, further comprising determining a mood severity of the mood state.

5. The method of claim 1, wherein the set of acoustic features correspond to Geneva Minimalistic Acoustic Parameter Set (GeMAPS) features.

6. The method of claim 1, wherein the set of acoustic features correspond to log Mel-frequency bank (log-MFB) features.

7. The method of claim 1, wherein the trained machine learning model is a deep feed-forward neural network.

8. The method of claim 1, wherein the trained machine learning model is a convolutional neural network.

9. The method of claim 1, further comprising:
   correlating the mood state to a mood label, wherein the mood label is selected from the group consisting of euthymic, manic, and depressed.

10. The method of claim 9 wherein correlating the mood state to the mood label includes scoring the mood state using one or both of (i) a Hamilton Depression Scale, and (ii) Young Mania Rating Scale.

11. The method of claim 1, further comprising:
    repeating steps (1)-(4) at least once during a predetermined time period and at a predetermined time interval, to generate a plurality of mood states of the user, the plurality of mood states including a plurality of dimensional emotion values;
    analyzing the plurality of dimensional emotion values to determine a mean emotion value with respect to mania and a mean emotion value with respect to depression; and
    analyzing the mean emotion value with respect to mania and the mean emotion value with respect to depression to determine a condition of the user.

12. The method of claim 11, wherein the condition of the user is bipolar disorder.

13. The method of claim 1, further comprising:
    extracting language expressed in the audio sample, wherein generating the one or more dimensional emotion values includes analyzing the language expressed in the audio sample.

14. An improved quantitative mood state prediction system, the system comprising:
    a first computing device comprising a processor, a microphone, and a non-transitory memory, the memory storing instructions that, when executed by the processor, cause the processor to:
    receive, based on an occurrence of an event, a digital audio sample via the microphone; and
    a second computing device comprising a processor and a non-transitory memory, the memory storing instructions that, when executed by the processor, cause the processor to:
    extract a set of acoustic features from the digital audio sample;
    generate one or more dimensional emotion values, by analyzing the set of acoustic features using a machine learning model trained by processing a longitudinal set of labeled assessment call segments; and
    determine a mood state of a user based on the one or more dimensional emotion values.

15. The mood state prediction system of claim 14, wherein the first computing device and the second computing device are the same device.

16. The mood state prediction system of claim 14, including further instructions that, when executed by the processor, cause the processor to:
    transmit one or both of (i) the audio sample, and (ii) the set of acoustic features from the first computing device to the second computing device.

17. The mood state prediction system of claim 14, wherein the event relates to either (i) an initiation of an outgoing telephone call, (ii) an acceptance of an incoming telephone call, or (iii) an ambient audio trigger.

18. The mood state prediction system of claim 14, wherein the machine learning model is a deep feed-forward neural network.

19. The mood state prediction system of claim 14, wherein the machine learning model is a convolutional neural network.

20. The mood state prediction system of claim 14, including further instructions that, when executed by the processor, cause the processor to:
    correlate the mood state to a mood label, wherein the mood label is selected from the group consisting of euthymic, manic, and depressed.

* * * * *